(12) United States Patent
Sasaki et al.

(10) Patent No.: US 7,287,331 B2
(45) Date of Patent: Oct. 30, 2007

(54) POWER WORKING MACHINE

(75) Inventors: Hideshi Sasaki, Wako (JP); Kenjiro Hiratsuna, Wako (JP)

(73) Assignee: Honda Motor Co., Ltd. (JP)

( * ) Notice: Subject to any disclaimer, the term of this patent is extended or adjusted under 35 U.S.C. 154(b) by 435 days.

(21) Appl. No.: 10/980,670

(22) Filed: Nov. 3, 2004

(65) Prior Publication Data
US 2005/0115340 A1 Jun. 2, 2005

(30) Foreign Application Priority Data

Nov. 28, 2003 (JP) .............................. 2003-399974
Mar. 22, 2004 (JP) .............................. 2004-082970

(51) Int. Cl.
*B27B 19/02* (2006.01)

(52) U.S. Cl. ............................ 30/519; 30/210; 30/216; 30/382; 16/110.1; 16/900

(58) Field of Classification Search .................. 30/210, 30/216, 382, 383, 519; 16/110.1, 426, 900; 74/25; 83/837; 451/516, 525
See application file for complete search history.

(56) References Cited

U.S. PATENT DOCUMENTS 5,065,476 A * 11/1991 Dohse et al. .................. 16/426
6,108,867 A 8/2000 Nagashima ................ 16/110.1

FOREIGN PATENT DOCUMENTS

JP 11028683 2/1999

* cited by examiner

*Primary Examiner*—Boyer D. Ashley
*Assistant Examiner*—Carolyn T Blake
(74) *Attorney, Agent, or Firm*—Adams & Wilks

(57) ABSTRACT

A power working machine has a machine body, a drive source mounted on the machine body for driving a work implement connected to the machine body, and an operating handle mounted on the machine body for undergoing rotation relative to the machine body. A throttle lever is mounted on the operating handle for undergoing pivotal movement to adjust an output of the drive source. A lock mechanism is mounted on the operating handle for locking the operating handle at a preselected rotational angular position relative to the machine body. A lock cancellation lever is mounted on the operating handle for unlocking the lock mechanism to thereby permit rotational movement of the operating handle relative to the machine body. A stopper section is mounted on the operating handle for permitting operation of the lock mechanism while preventing pivotal movement of the throttle lever and for preventing operation of the lock mechanism while permitting pivotal movement of the throttle lever.

3 Claims, 21 Drawing Sheets

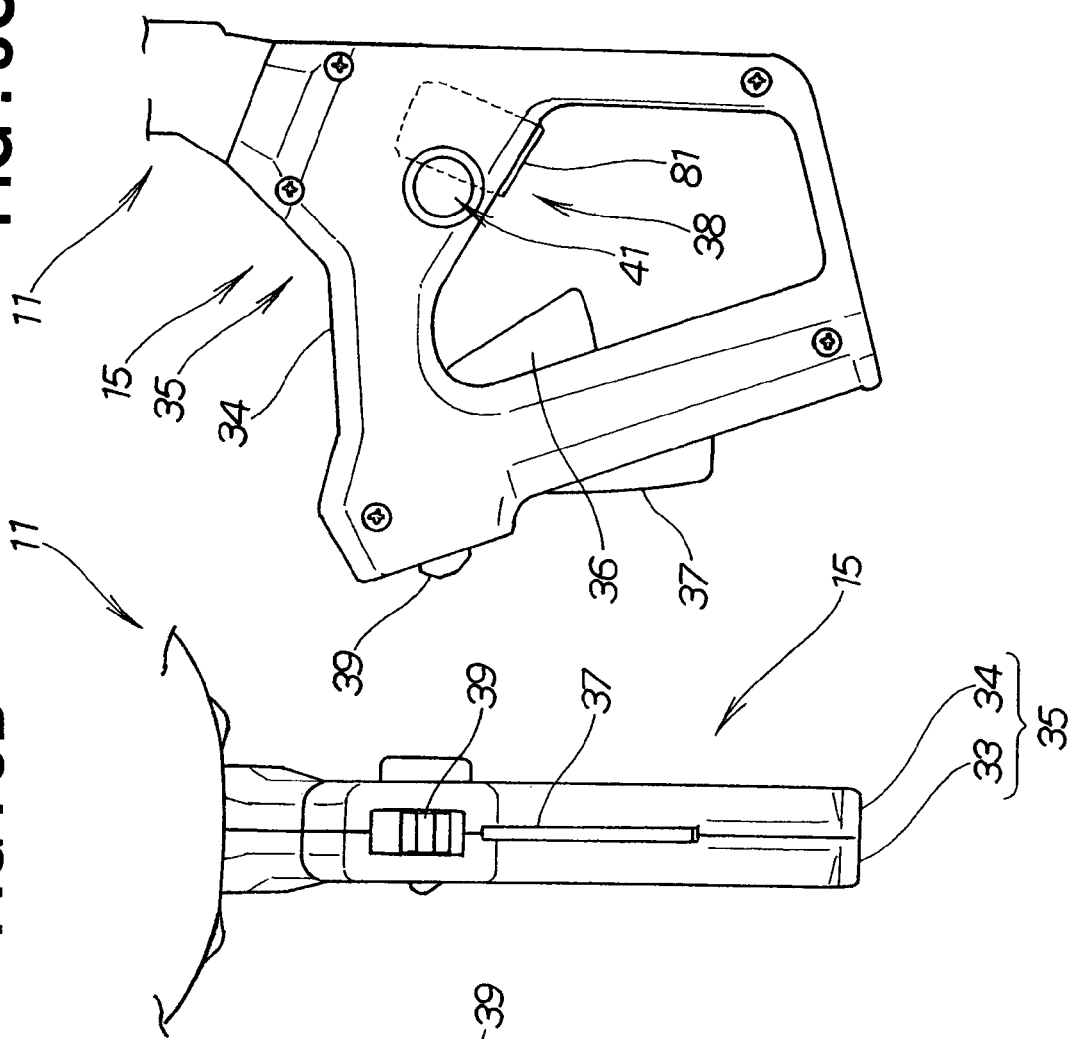
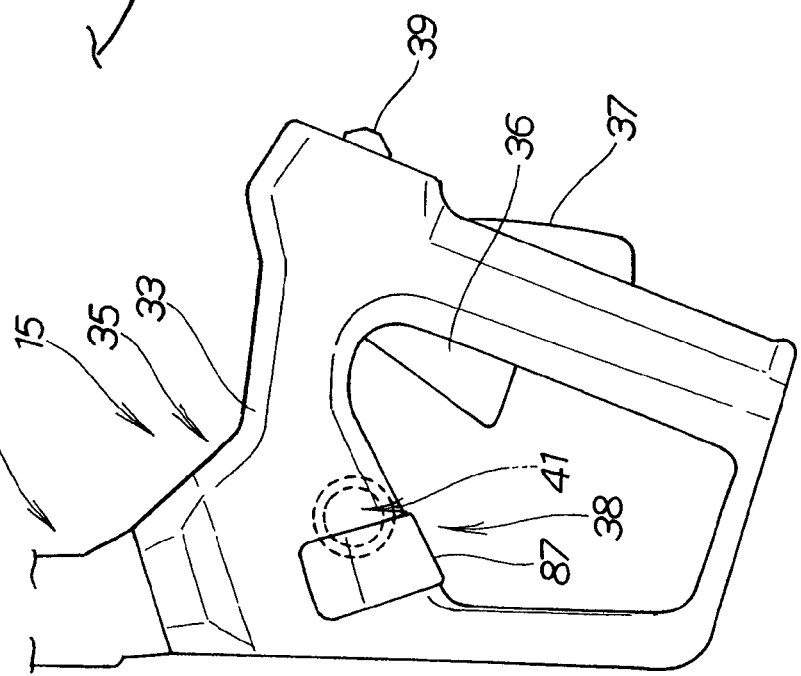

POWER WORKING MACHINE

FIELD OF THE INVENTION

The present invention relates to a power working machine which can trim an upper surface, side surface, etc. of a hedge with an enhanced workability by allowing a human operator to rotate its operating handle in accordance with desired trimming positions.

BACKGROUND OF THE INVENTION

Examples of power working machines in practical use today include those in which an operating handle is rotatably mounted on a machine body, a throttle lever is mounted on the operating handle for adjustment of an output power from a drive source, such as an engine, and a throttle lock lever is also mounted on the operating handle for locking the throttle lever. For practical use, it has been only necessary that the power working machines include, in addition to the throttle lever and throttle lock lever, a lock mechanism provided on the machine body for locking the operating handle at a desired rotational angle relative to the machine body and an operation lever dock-canceling lever) for canceling the locking, by the lock mechanism, of the operating handle. One example of the conventional power working machines is known from JP-A-11-28683, where the lock mechanism is constructed to operate in response to human operator's manipulation of a throttle wire.

FIG. 24 hereof is a view showing a fundamental construction of the conventionally-known power working machine. The power working machine 200 has a handle structure which includes: an operating handle 202 rotatably mounted on the machine body 201, a throttle lever 203 pivotably attached to the operating handle 202; a throttle lock lever 204 for locking the throttle lever 203; and a lock member 205 that is caused to project, in response to actuation of the throttle lever 203, into abutment against the machine body 201 to thereby lock the operating handle 202 at a desired rotational angle relative to the machine body 201. Namely, a user or human operator can lock the operating handle 202 against the machine body 201 by first disengaging the throttle lock lever 204 from the throttle lever 203 as depicted by arrow c1 and then gripping the throttle lever 203 as depicted by arrow c2 to cause the lock member 205 to project as depicted by arrow c3.

However, with the conventional power working machine 200, the human operator's rotating and locking operation of the operating handle 202 is very cumbersome and complicated because the human operator has to first rotate the handle 202 through a desired rotational angle relative to the machine body 201, disengage the throttle lock lever 204 from the throttle lever 203 and then grip the throttle lever 203 to thereby press the lock member 205 against the machine body 201 so as to lock the handle 202. Further, because the conventional power working machine 200 is not constructed to allow the human operator to lock the handle 202 at a desired position simultaneously with the disengagement of the throttle lock lever 204 from the throttle lever 203, the machine 200 lacks operational reliability in that trimming blades (not shown) would be undesirably activated prior to the locking, against the machine body 201, of the handle 202 depending, for example, on connection timing of a centrifugal clutch etc.

Thus, there has heretofore been a demand for an improved power working machine which allows the human operator to rotate the operating handle with simple operation and which can reliably prevent human operator's erroneous operation, e.g. by not only inhibiting or disabling human operator's operation of the throttle lever during rotating operation of the handle but also disabling rotating operation of the handle during operation of the throttle lever.

SUMMARY OF THE INVENTION

In view of the foregoing prior art problems, it is an object of the present invention to provide an improved power working machine which allows the human operator to rotate the operating handle as desired with simple operation and which also allows the human operator to operate the throttle lever and operating handle with increased reliability.

In order to accomplish the above-mentioned object, the present invention provides a power working machine, which comprises: a machine body with a drive source mounted substantially centrally thereon; trimming blades attached to a front portion of the machine body and drivable by the drive source; an operating handle provided on a rear portion of the machine body for gripping by a human operator; and a throttle lever provided on the operating handle for pivotal movement between a non-operating position and an operating position, the output of the drive source being adjustable via the throttle lever. In the present invention, the operating handle is rotatably mounted on a shaft section extending from the machine body, and the operating handle includes: a lock mechanism for locking the operating handle at a desired rotational position relative to the machine body; a lock cancellation lever for unlocking the lock mechanism to thereby permit rotational movement of the operating handle; and a stopper section disposed at a position spaced apart from the throttle lever. The stopper section permits operation of the lock mechanism while the pivotal movement of the throttle lever is inhibited or disabled, but inhibits operation of the lock mechanism while the pivotal movement of the throttle lever is permitted.

For example, simplification of the rotating operation of the operating handle is very desirable in that it can significantly enhance the workability of the handle, and allowing the operation of the throttle lever and the rotating operation of the handle to be performed with increased reliability is also desirable in that it can effectively prevent erroneous operation by the human operator.

For such purposes, the power working machine of the present invention includes the lock cancellation lever provided in the operating handle for unlocking the lock mechanism, and the stopper section, provided at a position of the operating handle spaced apart from the throttle lever, for permitting operation of the lock mechanism while the pivotal movement of the throttle lever is inhibited or disabled, but inhibiting operation of the lock mechanism while the pivotal movement of the throttle lever is permitted. The provision of the lock cancellation lever, provided in the handle for unlocking the lock mechanism, allows the human operator to perform rotating operation of the operating handle independently or separately from the throttle lever. As a result, the human operator can perform rotating operation of the operating handle with ease, which can enhance the workability and operational ease of the handle.

Further, with the stopper section arranged to function as noted above, rotating operation of the operating handle is inhibited during operation of the throttle lever, and operation of the throttle lever is inhibited during rotating operation of the operating handle. As a result, the throttle lever and operating handle can be operated with increased reliability.

Furthermore, with the stopper section spaced apart from the throttle lever, the human operator can be prevented not only from touching the stopper section when operating the throttle lever, but also from touching the throttle lever while operating the stopper section. As a result, the present invention can avoid erroneous operation of the throttle lever and operating handle with even further increased reliability.

In an embodiment, the lock cancellation lever is movable along the axis of the shaft section, and the stopper section is movable in a direction perpendicular to the axis of the shaft section. Thus, the human operator can rotate the operating handle relative to the machine body by two successive actions, i.e. by moving the stopper section perpendicularly to the axis of the shaft section and then operating the lock cancellation lever along the axis. As a result, the rotating operation of the operating handle can be performed with even further enhanced reliability.

Further, the stopper section has a first engagement portion that engages with the throttle lever while the lock mechanism is unlocked, and a second engagement portion that engages with the lock mechanism while the pivotal movement of the throttle lever is permitted. Thus, whenever necessary, respective movement of the throttle lever and lock mechanism can be reliably stopped by the stopper section. As a result, the stopper section can be switched in its engaging position with enhanced reliability.

BRIEF DESCRIPTION OF THE DRAWINGS

Certain preferred embodiments of the present invention will hereinafter be described in detail, by way of example only, with reference to the accompanying drawings, in which:

FIGS. 3A to 3C are a left side view, right side view and top plan view, respectively, of an operating handle employed in the power working machine of the present invention;

FIG. 23 is a view explanatory of operation of the operating handle, which particularly shows various rotational positions the handle can be set in.

DETAILED DESCRIPTION OF THE PREFERRED EMBODIMENTS

Figure 1:
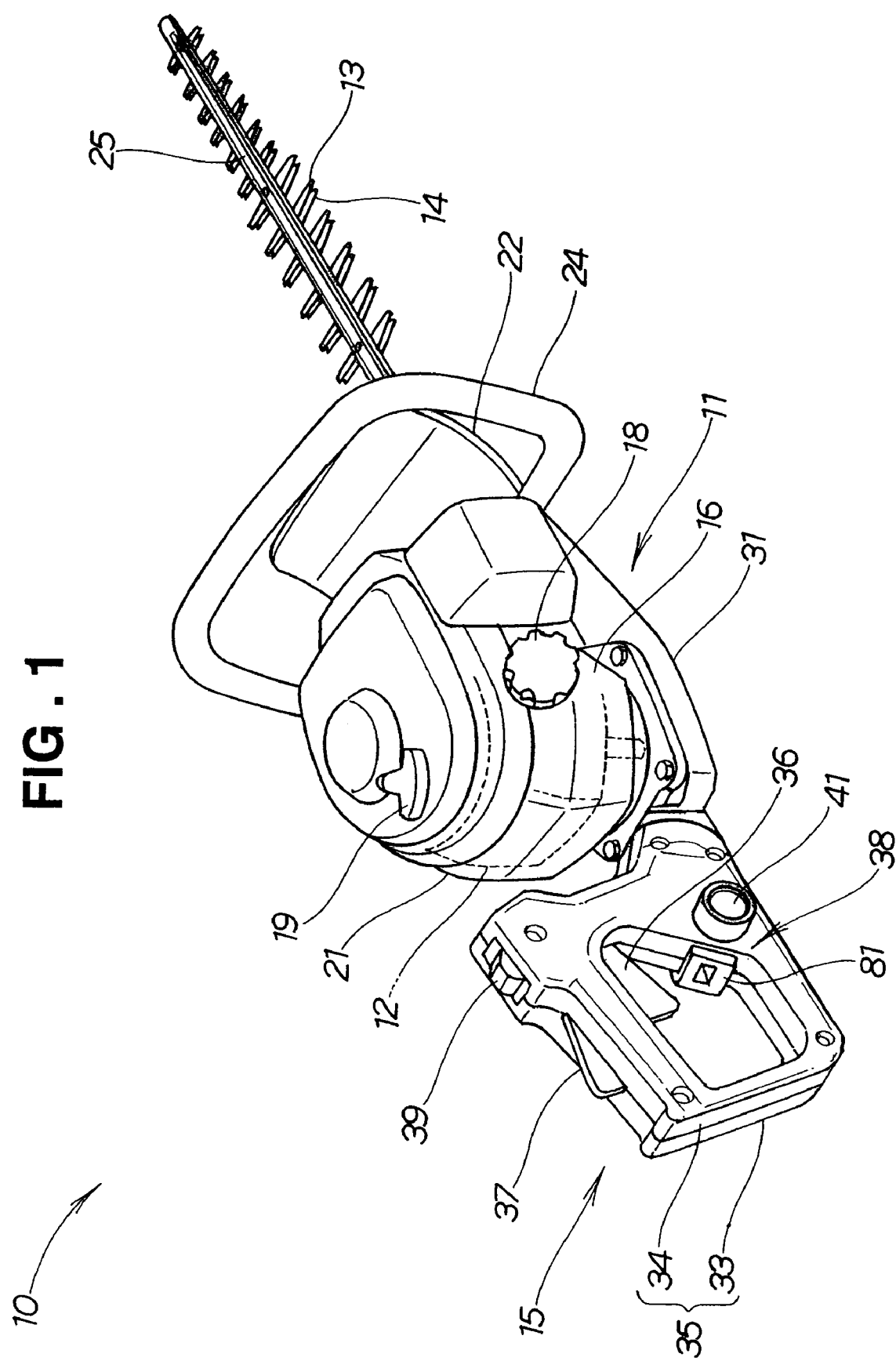
FIG. 1 is a perspective view of a power working machine in accordance with a first embodiment of the present invention.

Initial reference is made to FIG. 1 illustrating in perspective a power working machine in accordance with a first embodiment of the present invention. The power working machine 10 of FIG. 1 is specifically constructed as a "hedge trimmer", where a rotation force output from a drive source 12, such as an engine, is converted, after appropriate speed reduction, into reciprocating movement and the resultant reciprocating movement is delivered to a work implement comprising cutting means in the form of upper and lower trimming blades 13 and 14 to trim a hedge. Also, in the power working machine 10, an operating handle 15 can be turned or rotated relative to the machine body, as necessary, in accordance with a changing operating posture or position of a human operator (user) when trimming an upper or side surface of a hedge.

Figure 2:
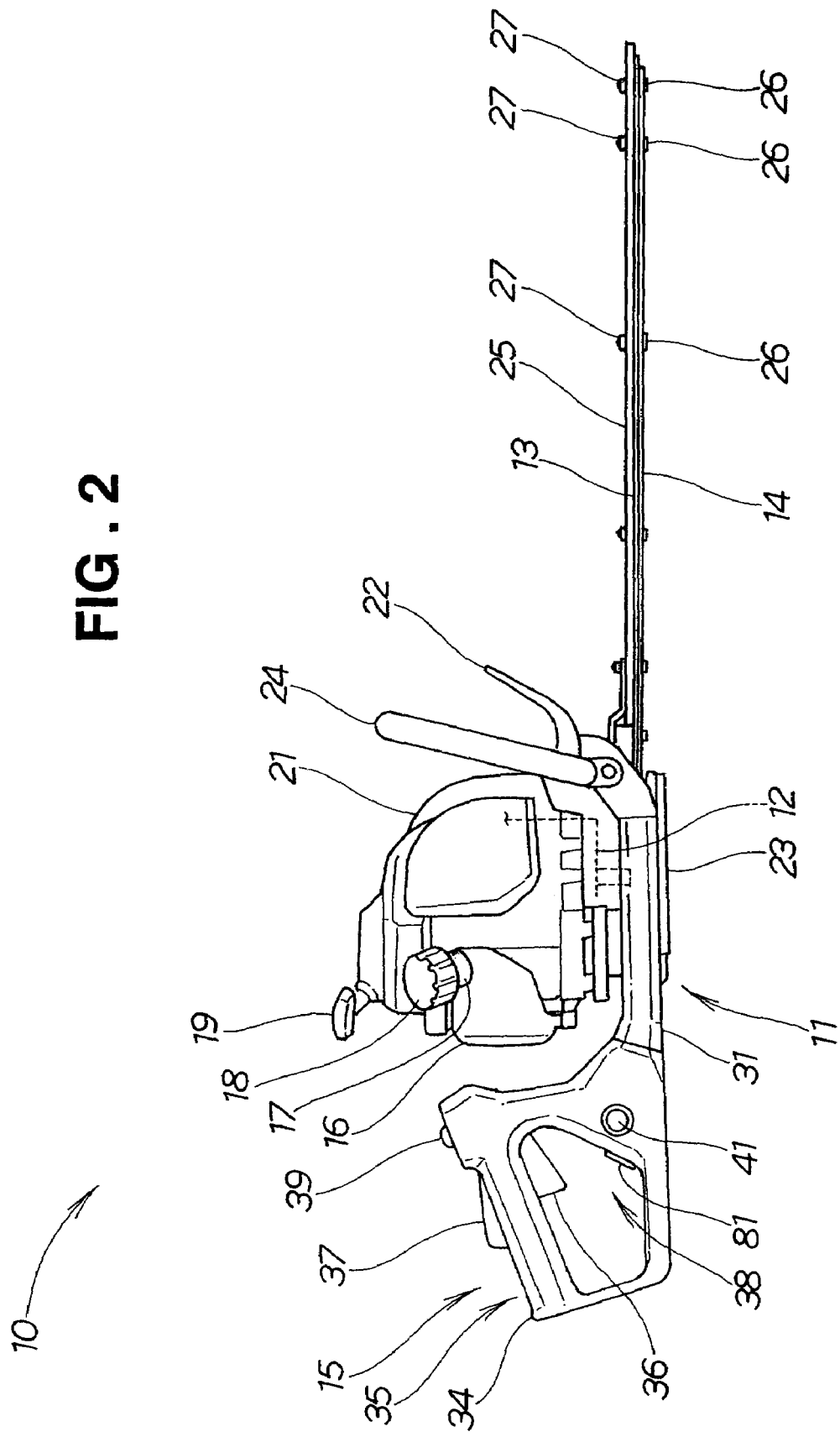
FIG. 2 is a side view of the power working machine of the present invention.

FIG. 2 is a side view of the power working machine 10 of the invention. As shown, the power working machine (hedge trimmer) 10 includes the drive source 12 mounted generally centrally on the machine body 11, a fuel tank 16 for holding fuel to be supplied to the drive source 12, and a cap 17 covering a fill opening of the fuel tank 16. The power working machine 10 also includes a recoil starter knob 19 operable by the human operator to activate the drive source 12, a cover 21 covering the drive source 12, and a protector 22 disposed on a front surface portion of the drive source 12 for preventing scattering of trimmed branches, leaves, etc. Further, the power working machine 10 includes a bottom cover member 23 provided on the underside of the machine body 11 for sliding movement on and along a hedge or the like to go on with desired trimming work, the operating handle 15 rotatably mounted on a rear portion of the machine body 11 for being held or gripped with one hand of the human operator so as to support the machine body 11 with the one hand during the trimming work, and a non-rotatable, closed-loop-shaped fixed handle 24 provided forwardly of the machine body 11 for being held or gripped with the other hand of the human operator during the trimming work. Further, the power working machine 10 includes a support frame 25 extending forwardly of the machine body 11 (i.e., away from the human operator) and having the upper and lower trimming blades 13 and 14 supported thereon in such a manner that the trimming blades 13 and 14 are sidable back and forth along the support frame 25, a plurality of screws 26 fastening the trimming blades 13 and 14 to the support frame 25 in conjunction with a plurality of nuts 27 screwed on the screws 26.

FIGS. 3A to 3C show the operating handle 15 employed in the power working machine 10 of the present invention, which particularly illustrate the positional arrangement of a throttle lever 36, throttle lock lever 37, lock cancellation lever (or unlocking lever) 81, starter switch 39 and stopper section 41. More specifically, FIGS. 3A, 3B and 3B are a left side view, top plan view and right side views, respectively, of the operating handle 15.

As illustrated in FIG. 3A, the lock cancellation lever (or unlocking lever) 81 for unlocking a later-described lock mechanism is mounted on the left side (i.e., left side as viewed by the human operator) of a loop-shaped handle body 35, and the throttle lever 36 for adjusting the output power of the drive source 12 (see FIG. 2) is disposed on an inner peripheral portion of the loop-shaped handle body 35. As illustrated in FIG. 3B, the throttle lock lever 37 for locking the throttle lever 36 when necessary is mounted on the topside of the handle body 35, and the starter switch 39 for activating or deactivating the drive source 12 is also mounted on the topside of the handle body 35. Further, as illustrated in FIG. 3C, the stopper section 41 for restricting operation of the lock cancellation lever 81 (or unlocking mechanism) is mounted on the right side of the handle body 35. The following paragraphs describe details of the operating handle 15.

Figure 4:
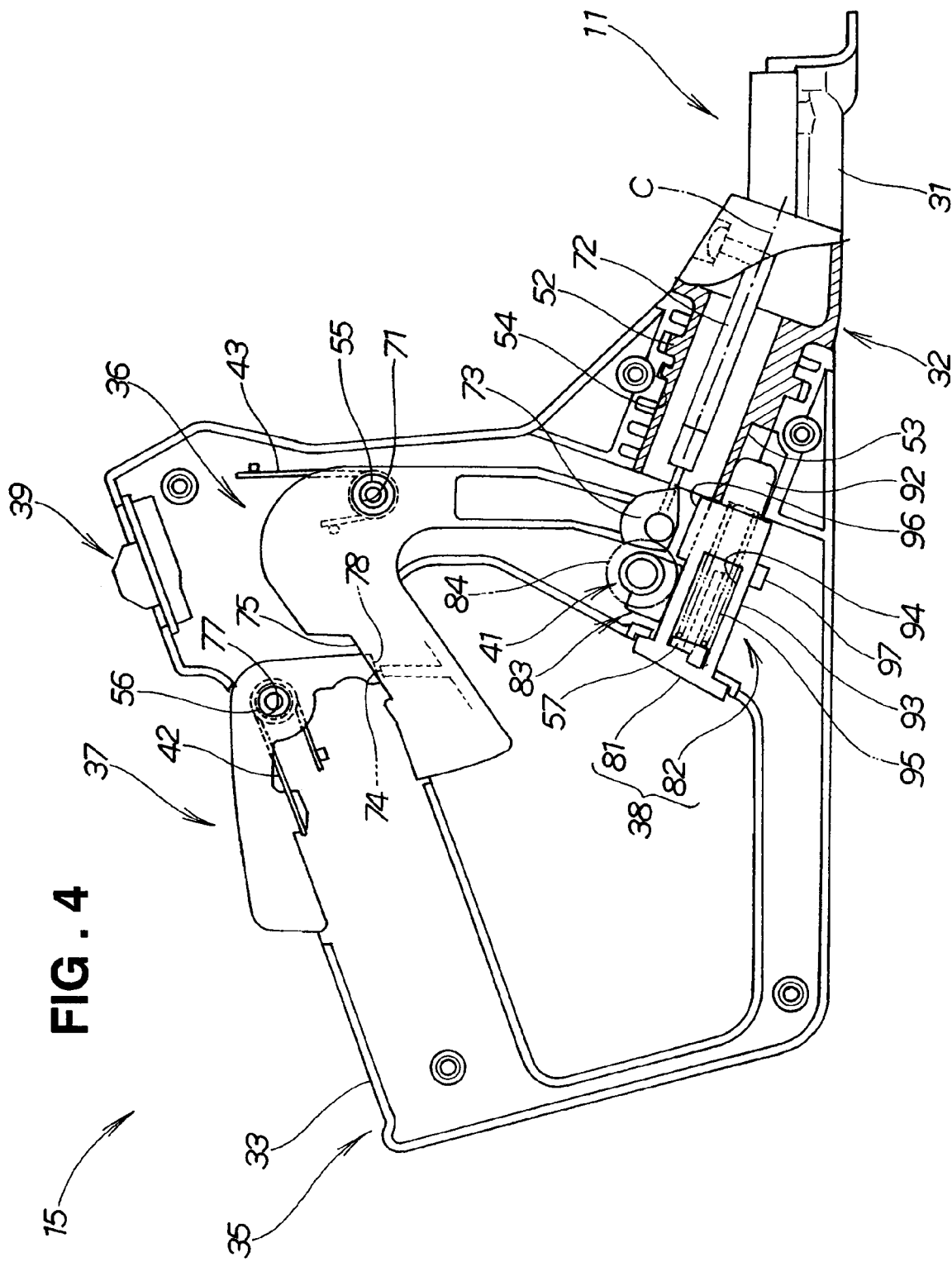
FIG. 4 is a partly-sectional side view of the operating handle of the power working machine of the present invention.

FIG. 4 is a partly-sectional side view of the operating handle 15 of the power working machine 10, which particularly shows one of left and right handle halves 33 and 34 (see FIG. 1); only the left handle half 33 is shown in FIG. 4 with the right handle half 34 removed. Case member 31 is mounted on the machine body 11 and accommodates therein mechanisms for reducing the rotation speed of the drive source 12 and for converting the speed-reduced rotation force into reciprocating movement, a shaft section 32 is provided on the case member 31, and the handle 15 is connected to the shaft section 32 for rotation relative to the machine body 11.

The operating handle 15 includes the handle body 35 composed of the left and right handle haves 33 and 34, the throttle lever 36 rotatably connected to the handle body 35 for adjusting the output power of the drive source 12 (see FIG. 2), and the throttle lock lever 37 pivotally connected to the handle body 35 for locking the throttle lever 36 when necessary. The operating handle 15 further includes first operating means in the form of a lever complex 38 connected to the handle body 35 for locking the handle 15 against the shaft section 32 (and hence the machine body 11) at a desired rotational angle or unlocking the handle 15 to permit rotation of the handle 15 relative to the machine body 11, and the starter switch 39 for activating/deactivating the drive source 12. The operating handle 15 further includes the stopper section 41 as second operating means for permitting operation of the lever complex 38 while the pivotal movement of the throttle lever 36 is restricted or disabled and for inhibiting operation of the lever complex 38 while the pivotal movement of the throttle lever 36 is permitted.

The throttle lever 36 includes a torsion spring 43 for returning the lever 36 to its initial position, and similarly the throttle lock lever 37 includes a torsion spring 42 for returning the lever 37 to its initial position. The stopper section 41 is spaced apart from the throttle lever 36, and the lever complex 38 includes the lock cancellation lever 81 and lock mechanism 82 as will be later described. In FIG. 4, C represents an axial centerline, and 97 represents a projection for retaining the lever complex 38 against accidental detachment.

Figure 5:
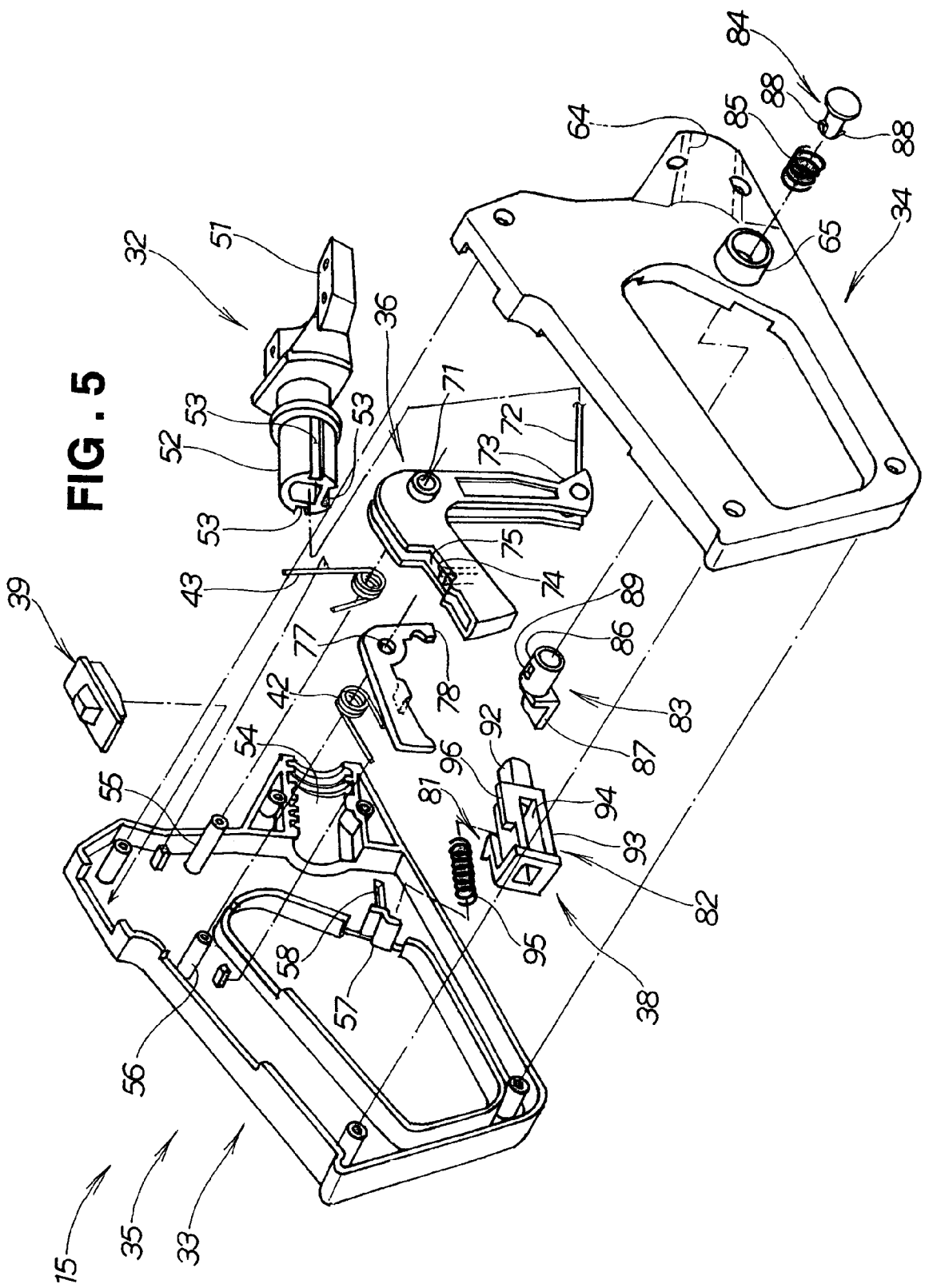
FIG. 5 is an exploded perspective view showing principal components of the operating handle employed in the power working machine of the present invention.

FIG. 5 is an exploded perspective view showing principal components of the operating handle 15 employed in the power working machine 10 of FIG. 1. The shaft section 32 of the machine body 11 has a mounting portion 51 to be secured to the case member 31, a cylindrical portion 52 for rotatably supporting the handle body 35, and a plurality of locking grooves 53 for locking the handle body 35 at a desired rotational angle relative to the machine body 11.

The left handle half 33 has a left fitting portion 54 for fitting around the shaft section 32, a boss 55 for rotatably mounting thereon the throttle lever 36, a boss 56 for rotatably mounting thereon the throttle lock lever 37, a rib 57 for supporting (holding) the lever complex 38, and a guide groove 58 for providing a slide guide for the lever complex 38.

The right handle half 34 has a right fitting portion 64 for fitting around the shaft section 32, and a guide cylinder 65 for slidably supporting the stopper section 41.

The throttle lever 36 has a hole portion 71 for rotatably fitting therein the throttle-lever mounting boss 55, a support portion 73 for supporting one end of a throttle wire 72, an engagement portion 74 for abutting engagement with the throttle lock lever 37, and a guide portion 75 for allowing part of the throttle lock lever 37 to escape from the engagement portion 74.

The throttle lock lever 37 has a hole portion 77 for fitting therein the throttle-lock-lever mounting boss 56, and an actuator portion 78 provided for abutting engagement with the engagement portion 74 in such a manner that it can escape from the engagement portion 74 to the guide portion 75 when necessary.

The lever complex 38 includes the lock cancellation lever or unlocking lever 81, and the lock mechanism 82 formed integrally with the lock cancellation lever 81.

The stopper section 41 includes a stopper body 83 for restricting operation of the throttle lever 36 and the lock mechanism 82, a stopper operating knob 84 provided on the stopper body 83, and a compression spring 85 interposed between the stopper operating knob 84 and the right handle half 34.

The stopper body 83 has a first engagement portion 86 that engages with the throttle lever 36 when the lock mechanism 82 is unlocked, a second engagement portion 87 that engages with the lock mechanism 82 when the throttle lever 36 is caused to pivot by the human operator, and fitting holes 89 (only one of the holes 89 is shown in FIG. 5) that fit over claws 88 of the stopper operating knob 84.

Figure 6:
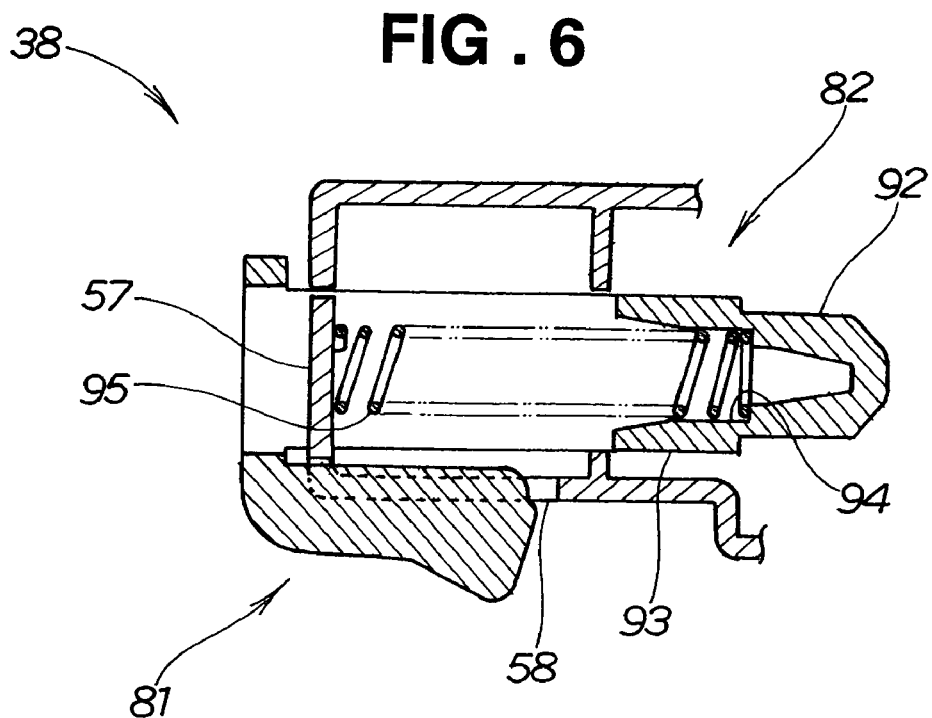
FIG. 6 is a longitudinal sectional view of a lock cancellation lever and lock mechanism employed in the power working machine of the present invention.

FIG. 6 is a longitudinal sectional view of the lock cancellation lever 81 and the lock mechanism 82 in the power working machine 10. The lock mechanism 82 has a projection 92 for fitting engagement with any desired one of the locking grooves 53 of the shaft section 32 (see FIG. 5), a horizontal portion 93 extending from the projection 92 toward the rear of the handle 15 (i.e., toward the human operator) to merge with the lock cancellation lever 81, a spring holding portion 94 formed in the horizontal portion 93, and a return spring 95 having its front end held by the spring holding portion 94 and its rear end held by the supporting rib 57 (see FIG. 4). The lock mechanism 82 also has a projecting portion 96 formed on the horizontal portion 93 for engagement with the second engagement portion 87 of the stopper body 83, and the above-mentioned lever-complex retaining projection 97 (FIG. 4).

The lock mechanism 82 has the return spring 95 accommodated in the spring holding portion 94, and the return spring 95 is supported at its rear end held by the supporting rib 57 and normally urges the lever complex 38 toward the front of the operating handle 15 (see FIG. 2).

Thus, by the human operator pulling the lever complex 38 toward the rear of the handle 15 (i.e., toward the human operator), the projection 92 of the lock mechanism 82 can be disengaged from a given one of the locking grooves 53 of the shaft section 32, so as to permit the human operator to rotate the handle 15. Further, as the human operator releases (i.e., unhands) the lever complex 38 after having rotated the handle 15 through a given rotational angle, the projection 92 can be automatically brought into engagement with another one of the locking grooves 53.

Figure 7:
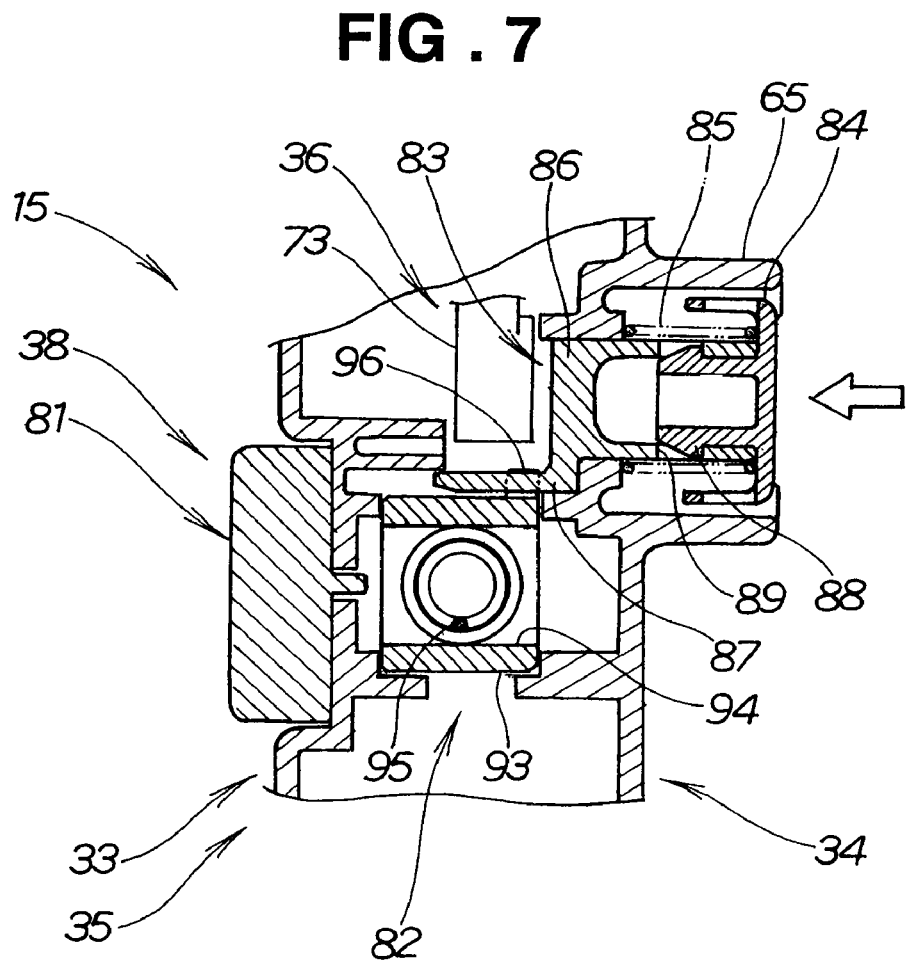
FIG. 7 is a vertical sectional view of the lock cancellation lever and lock mechanism in the power working machine of the present invention.

FIG. 7 is a vertical sectional view of the lock cancellation lever 81 and the lock mechanism 82 in the power working machine 10, which shows the throttle lever 36, lock cancellation lever 81 and lock mechanism 82 in their respective initial positions, i.e. positions before the stopper section 41 is pressed as indicated by a white arrow.

In the illustrated example of FIG. 7, where the second engagement portion 87 of the stopper section 41 is in engagement with the projecting portion 96 of the lock mechanism 82, the lock cancellation lever 81 integrally formed with the lock mechanism 82 can not be pulled toward the rear of the operating handle 15. Further, in the illustrated example of FIG. 7, the first engagement portion 86 is not in engagement with the support portion 73 of the throttle lever 36, the throttle lever 36 can be operated by the human operator.

For example, as the human operator presses the stopper operating knob 84 of the stopper body 41 as indicated by the white arrow, the first engagement portion 86 is bought into engagement with the support portion 73 of the throttle lever 36, and the second engagement portion 87 is disengaged from the projecting portion 96 of the lock mechanism 82. Consequently, the lock cancellation lever 81 can be pulled by the human operator, and the throttle lever 36 can be erroneously prevented from being operated by the human operator.

Figure 8:
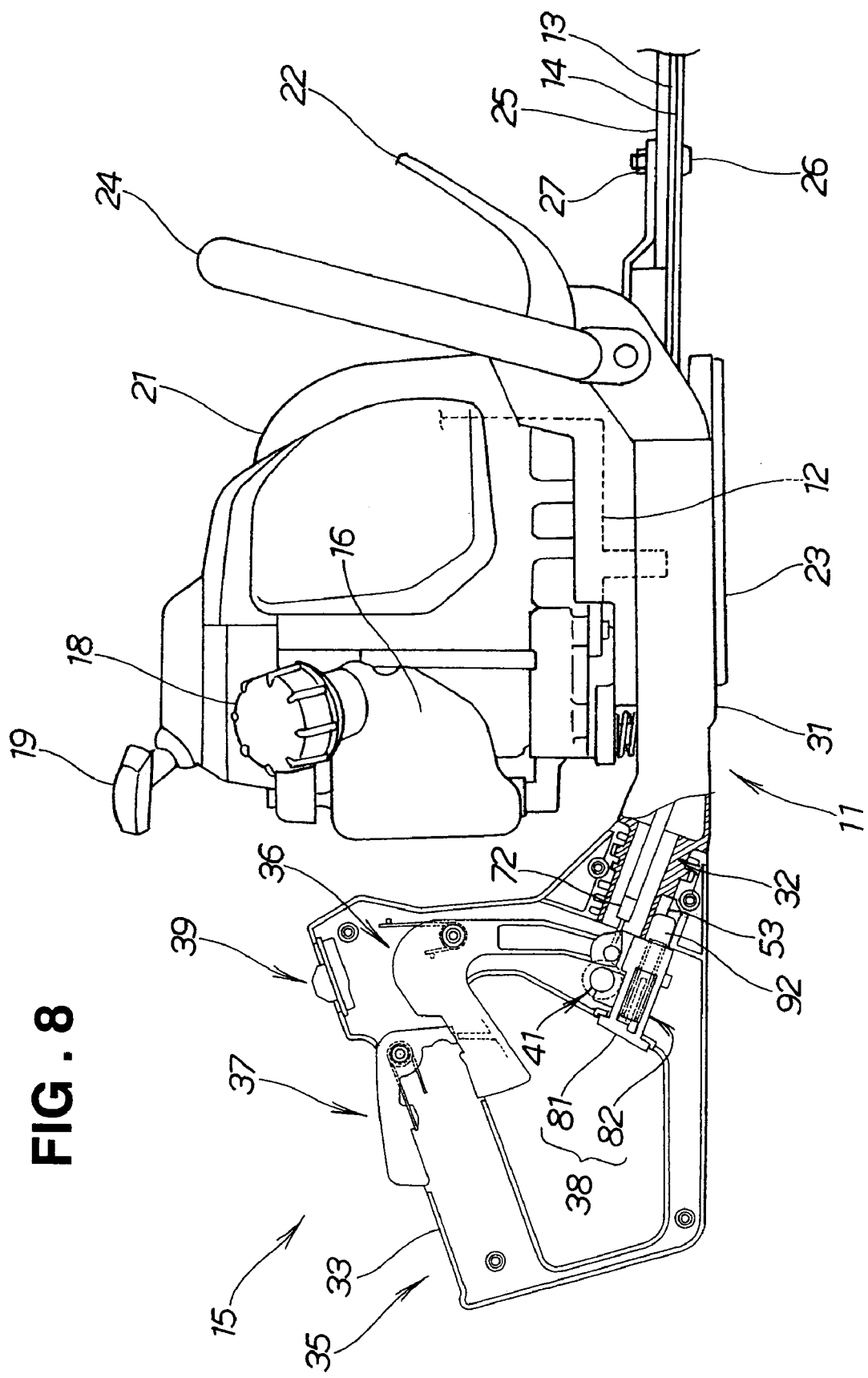
FIG. 8 is a view showing in enlarged scale principal sections of the power working machine of the present invention.

FIG. 8 is a view showing in enlarged scale principal sections of the power working machine 10. As shown, in the power working machine 10, the trimming blades 13 and 14 are attached to a front end portion of the machine body 11 for trimming braches, leaves and the like, and the operating handle 15 to be gripped by the human operator is mounted on a rear end portion of the machine body 11. The throttle lever 36 is mounted on a front portion of the operating handle 15 for pivotal movement between its non-operating and operating positions. The drive source 12 mounted substantially centrally on the machine body 11 drives the trimming blades 13 and 14, and the output power of the drive source 12 is adjustable via the throttle lever 36. Further, in the power working machine 10, the operating handle 15 is rotatably connected to the shaft section 32 extending from the machine body 11, and the lock mechanism 82 is provided in the operating handle 15 for locking the handle 15 at a desired rotational angle relative to the machine body 11, and the lock cancellation lever 81 is also provided in the operating handle 15 for unlocking the lock mechanism 82 as necessary. The stopper section 41 is provided, in the operating handle 15 at a position spaced apart from the throttle lever 36, for permitting operation of the lock mechanism 82 while the pivotal movement of the throttle lever 36 is inhibited and for disabling operation of the lock mechanism 82 while the pivotal movement of the throttle lever 36 is permitted.

For example, simplification of the rotating operation of the operating handle 15 is very desirable in that it can significantly enhance the workability of the handle 15, and allowing the operation of the throttle lever 36 and the rotating operation of the handle 15 to be performed with increased reliability is also desirable in that it can effectively prevent erroneous operation by the human operator.

For such purposes, the power working machine 10 of the present invention includes the lock cancellation lever 81 provided in the handle 15 for unlocking the lock mechanism 82, so as to allow the human operator to perform the rotating operation of the handle 15 independently or separately from the throttle lever 36.

Further, the power working machine 10 of the present invention includes the stopper section 41 provided in the operating handle 15 for permitting operation of the lock mechanism 82 while the pivotal movement of the throttle lever 36 is inhibited and for disabling or inhibiting operation of the lock mechanism 82 while the pivotal movement of the throttle lever 36 is permitted. Thus, the human operator is inhibited from operating the handle 15 during operation of the throttle lever 36 and from operating the throttle lever 36 during operation of the handle 15, with the result that operation of the throttle lever 36 and rotating operation of the handle 15 can be performed with increased reliability.

Further, with the stopper section 41 spaced apart from the throttle lever 36, the human operator can be prevented from not only touching the stopper section 41 when operating the throttle lever 36, but also touching the throttle lever 36 while operating the stopper section 41. As a result, the power working machine 10 can enhance its function for preventing the human operator from performing erroneous operation of the throttle lever 36 and operating handle 15.

Next, behavior of the power working machine 10 of the present invention will be described.

Figure 9A:
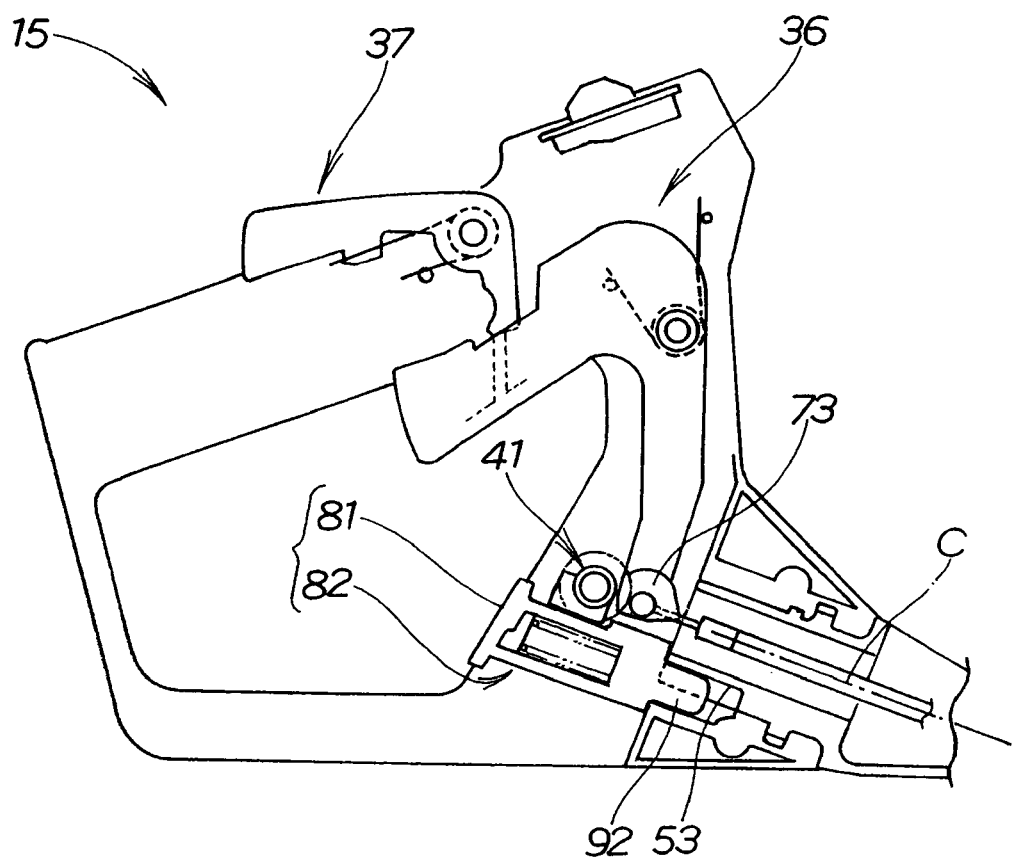
FIGS. 9A and 9B are views explanatory of how the operating handle is locked at a desired rotational angle in the power working machine of the present invention.
Figure 9B:
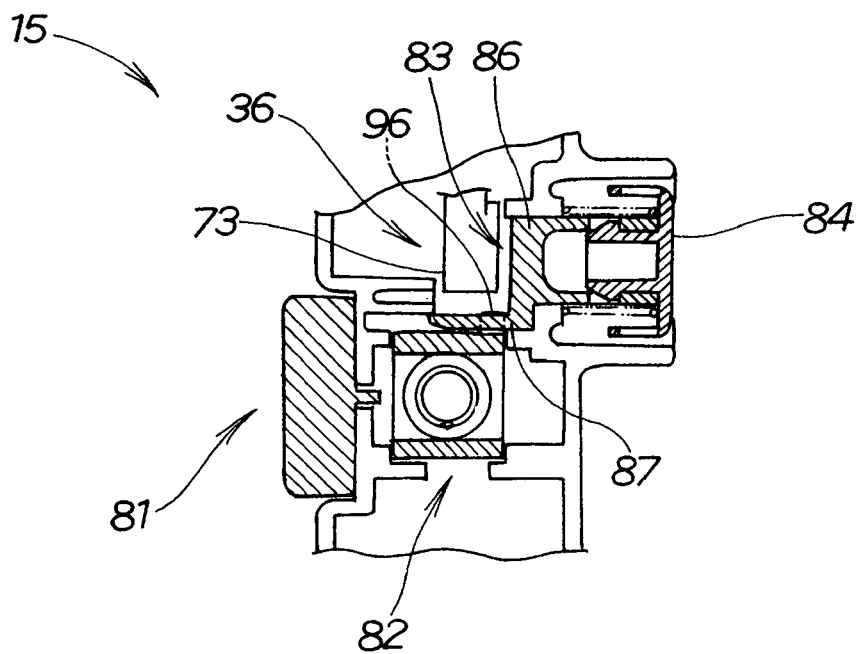

FIGS. 9A and 9B are views explanatory of how the operating handle 15 is locked at a desired rotational angle relative to the machine body 11 in the power working machine 10.

FIG. 9A shows the throttle lever 36, lock cancellation lever (unlocking lever) 81 and lock mechanism 82 in their respective initial positions before the stopper section 41 is pressed by the human operator.

When the second engagement portion 87 of the stopper section 41 is in engagement with the projecting portion 96 of the lock mechanism 82 as illustrated in FIG. 9B, the lock cancellation lever 81 integrally formed with the lock mechanism 82 can not be pulled toward the rear of the operating handle 15, so that rotating operation of the handle 15 is inhibited when the throttle lever 36 is in the operating position.

As seen in FIGS. 9A and 9B, the lock cancellation lever 81 is provided for movement along the axis (axial centerline) C of the shaft section 32 via which the operating handle 15 is rotatably mounted on the machine body 15, and the stopper section 41 is movable in a direction perpendicular to the axis of the shaft section. Thus, the human operator can rotate the handle 15 relative to the machine body 11 by two successive actions, i.e. by first moving the stopper section 41 perpendicularly to the axis C of the shaft section and then operating the lock cancellation lever 81 along the axis of the shaft section. As a result, the rotating operation of the handle 15 can be performed by the human operator with enhanced reliability.

Further, with the stopper section 41 having the first engagement portion 86 engaging with the throttle lever 36 while the lock mechanism 82 is unlocked and the second engagement portion 87 engaging with the lock mechanism 82 while the pivotal movement of the throttle lever 36 is permitted, movement of the throttle lever 36 or lock mechanism 82 can be reliably stopped when operation of the lever 36 or lock mechanism 82 is to be restricted. As a result, the stopper section 41 can be switched in its engaging position with enhanced reliability.

Figure 10A:
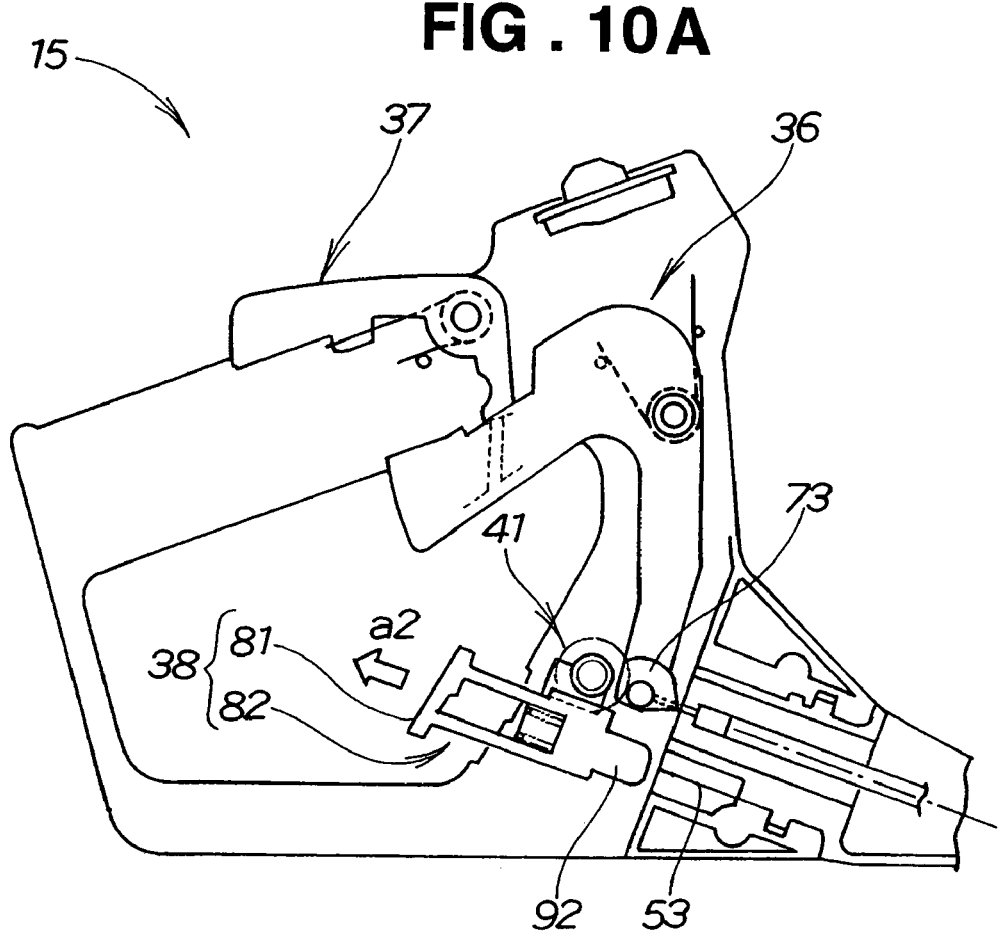
FIGS. 10A and 10B are views explanatory of how the operating handle is rotated relative to a machine body in the power working machine of the present invention.
Figure 10B:
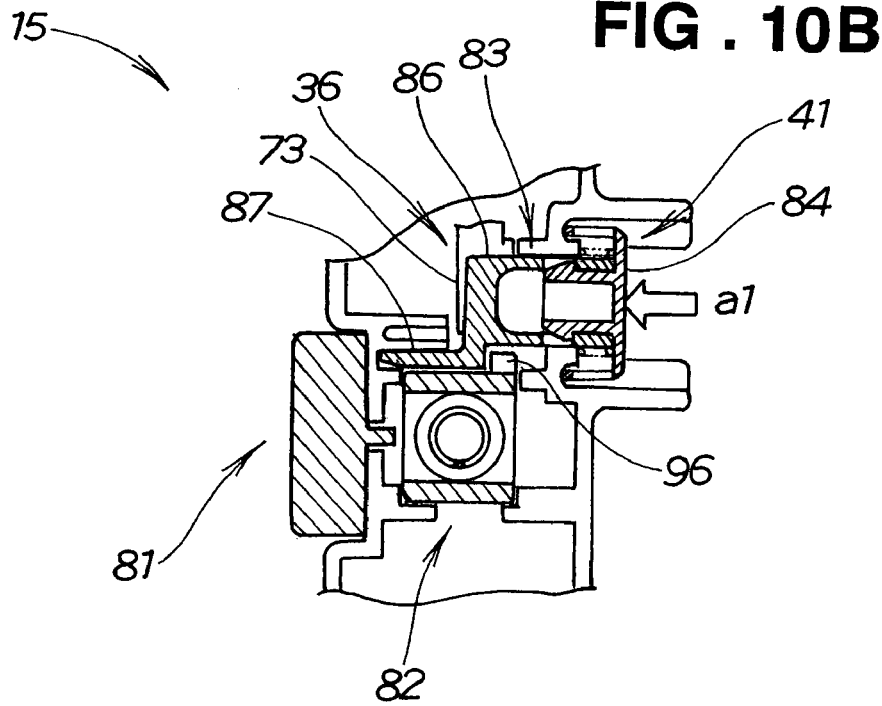

FIGS. 10A and 10B are views explanatory of how the operating handle 15 is rotated relative to the machine body 11 in the power working machine 10.

As the human operator presses the stopper operating knob 84 of the stopper section 41 as indicated by white arrow al in FIG. 10B (i.e., leftward in the figure), the first engagement portion 86 is bought into engagement with the support portion 73 of the throttle lever 36, and the second engagement portion 87 is disengaged or released from the projecting portion 96 of the lock mechanism 82. Then, the lock cancellation lever 81 can be pulled as indicated by an arrow a2 in FIG. 10A, but operation of the throttle lever 36 can be prevented because the first engagement portion 86 is now in engagement with the support portion 73 of the throttle lever 36. As a consequence, the human operator can rotate the operating handle 15 while being effectively prevented from erroneously operating the throttle lever 36.

Figure 11A:
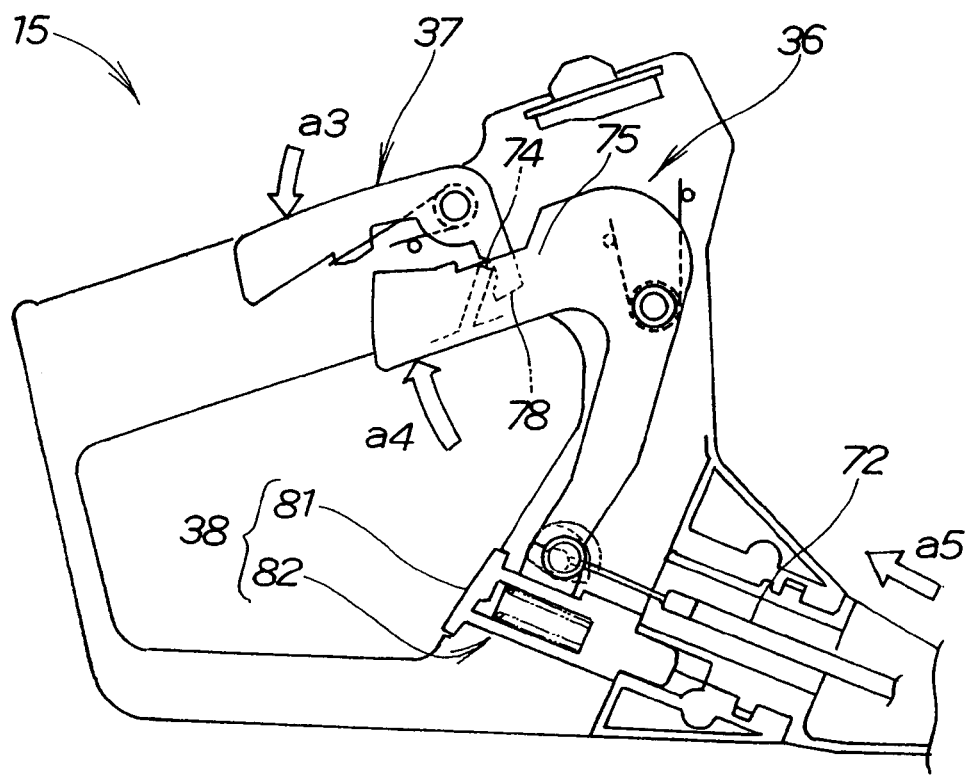
FIGS. 11A and 11B are views explanatory of how a throttle lever operates in the power working machine of the present invention.
Figure 11B:
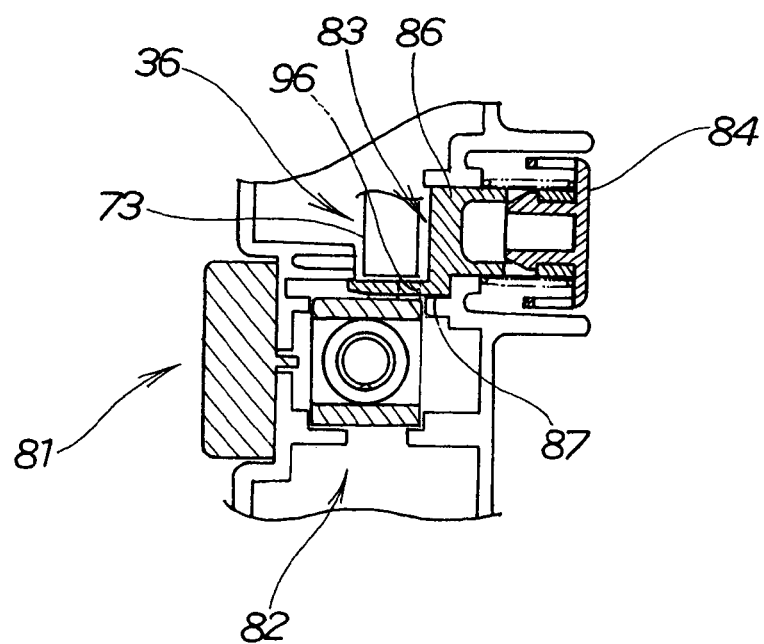

FIGS. 11A and 11B are views explanatory of how the throttle lever 36 operates in the power working machine 10.

By the human operator causing the throttle lock lever 37 to pivot, as indicated by an arrow a3 in FIG. 11A, so that the actuator 78 is forced away from the engagement portion 74 to the escape guide portion 75, the human operator can turn the throttle lever 36, as indicated by an arrow a4, to thereby pull the throttle wire 72 as indicated by an arrow a5. Because the second engagement portion 87 of the stopper section 41 is now in engagement with the projecting portion 96 of the lock mechanism 82 as seen in FIG. 11B, the lock cancellation lever 81 integrally formed with the lock mechanism 82 can not be pulled toward the rear of the operating handle 15 (see FIG. 5).

Figure 12:
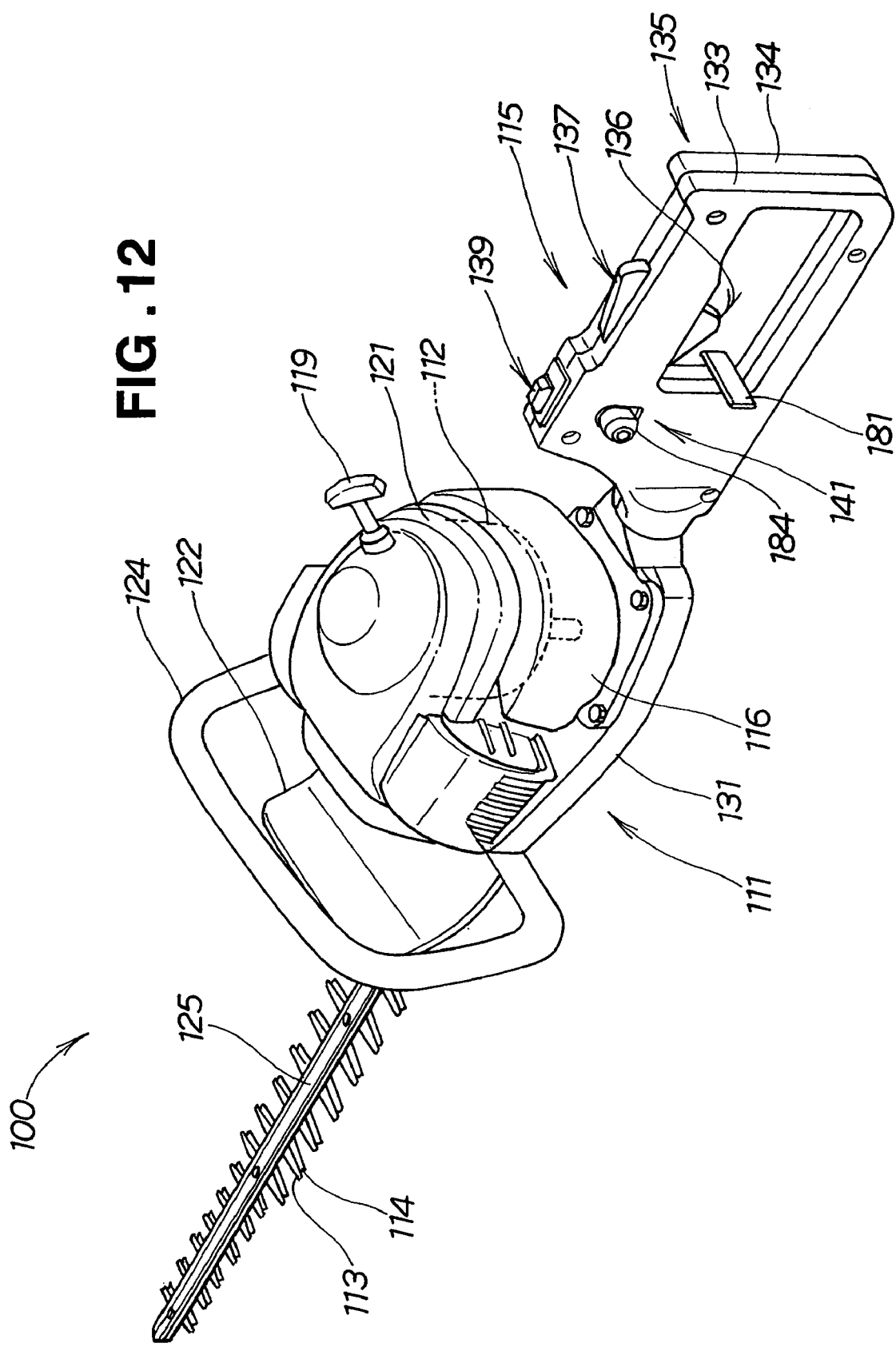
FIG. 12 is a perspective view of a power working machine in accordance with another or second embodiment of the present invention.

FIG. 12 is a perspective view of a power working machine in accordance with another or second embodiment of the present invention. The power working machine 100 of FIG. 12 is specifically constructed as a "hedge trimmer", where a rotation force output from a drive source 112, such as an engine, is converted, after appropriate speed reduction, into reciprocating movement and the resultant reciprocating movement is delivered to upper and lower trimming blades 113 and 114 to trim a hedge. Also, in the power working machine 100, an operating handle 115 can be turned or rotated relative to the machine body, as necessary, in accordance with a changing operating posture or position of a human operator (user) when trimming an upper or side surface of a hedge.

Figure 13:
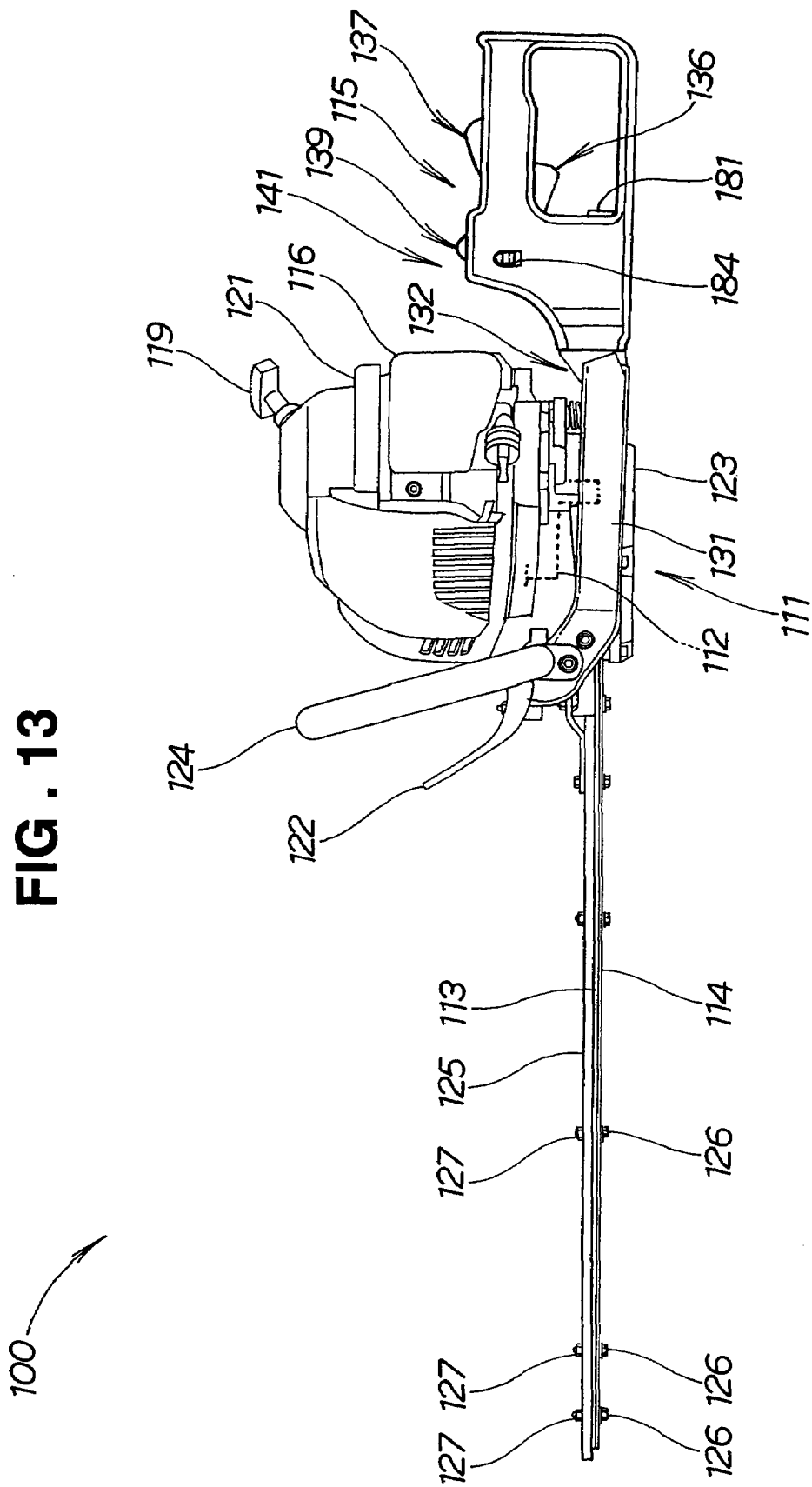
FIG. 13 is a side view of the second embodiment of the power working machine of FIG. 12.

FIG. 13 is a side view of the second embodiment of the power working machine 100 shown in FIG. 2. As shown, the power working machine 100 includes the drive source 112 mounted generally centrally on the machine body 111, a fuel tank 116 for holding fuel to be supplied to the drive source 112, a recoil starter knob 119 operable by the human operator to activate the drive source 112, a cover 121 covering the drive source 112, and a protector 122 disposed on a front surface portion of the drive source 112 for preventing scattering of trimmed branches, leaves, etc. Further, the power working machine 100 includes a bottom cover member 123 provided on the underside of the machine body 111 for sliding movement on and along a hedge or the like to go on with desired trimming work, the operating handle 115 rotatably mounted on a rear portion of the machine body 111 for being held or gripped with one hand of the human operator so as to support the machine body 111 with the one hand during the trimming work, and a non-rotatable, closed-loop-shaped fixed handle 124 provided forwardly of the machine body 111 for being held or gripped with the other hand of the human operator during the trimming work. Furthermore, the power working machine 100 includes a support frame 125 extending forwardly of the machine body 111 (i.e., away from the human operator) and having the upper and lower trimming blades 113 and 114 supported thereon in such a manner that the trimming blades 113 and 114 are slidable back and forth along the support frame 125. A plurality of screws 126 fasten the trimming blades 113 and 114 to the support frame 125 in conjunction with a plurality of nuts 127.

Case member 131 is mounted on the machine body 111 and accommodates therein mechanisms for reducing the rotation speed of the drive source 112 and for converting the speed-reduced rotation force into reciprocating movement, a shaft section 132 is provided on the case member 31, and the operating handle 115 is connected to the shaft section 132 for rotation relative to the machine body 111.

Figure 14:
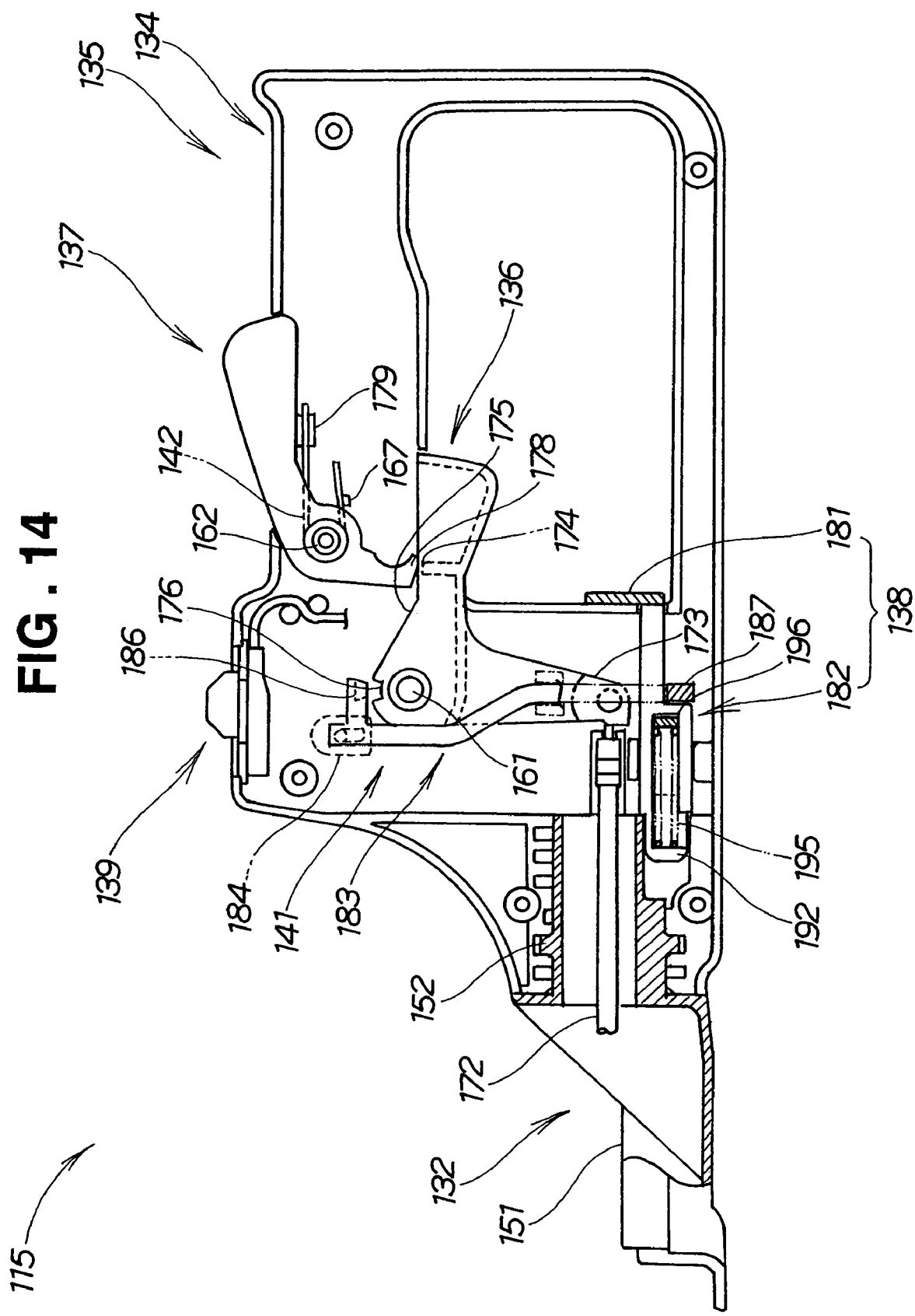
FIG. 14 is a partly-sectional side view of an operating handle employed in the second embodiment of the power working machine of the present invention.

FIG. 14 is a partly-sectional side view of the operating handle 115 of the power working machine 100, which particularly shows one of left and right handle halves 133 and 134 (see FIG. 12); only the left handle half 133 is shown in FIG. 14 with the right handle half 134 removed.

The operating handle 115 includes a handle body 135 composed of the left and right handle haves 133 and 134, a throttle lever 136 rotatably connected to the handle body 135 for adjusting the output power of the drive source 112 (see FIG. 13), and a throttle lock lever 137 pivotally connected to the handle body 135 for locking the throttle lever 136 when necessary. The operating handle 115 further includes a lever complex 138 connected to the handle body 135 for locking the handle 115 against the shaft section 132 (and hence the machine body 111) at a desired rotational angle or unlocking the handle 115 to permit rotation of the handle 115 relative to the machine body 111, and a starter switch 139 for activating/deactivating the drive source 112. The operating handle 115 further includes a stopper section 141 for permitting operation of the lever complex 138 while the pivotal movement of the throttle lever 136 is inhibited or disabled and for inhibiting operation of the lever complex 138 while the pivotal movement of the throttle lever 136 is permitted. The throttle lock lever 137 includes a torsion spring 142 for returning the lever 137 to its initial position.

Figure 15:
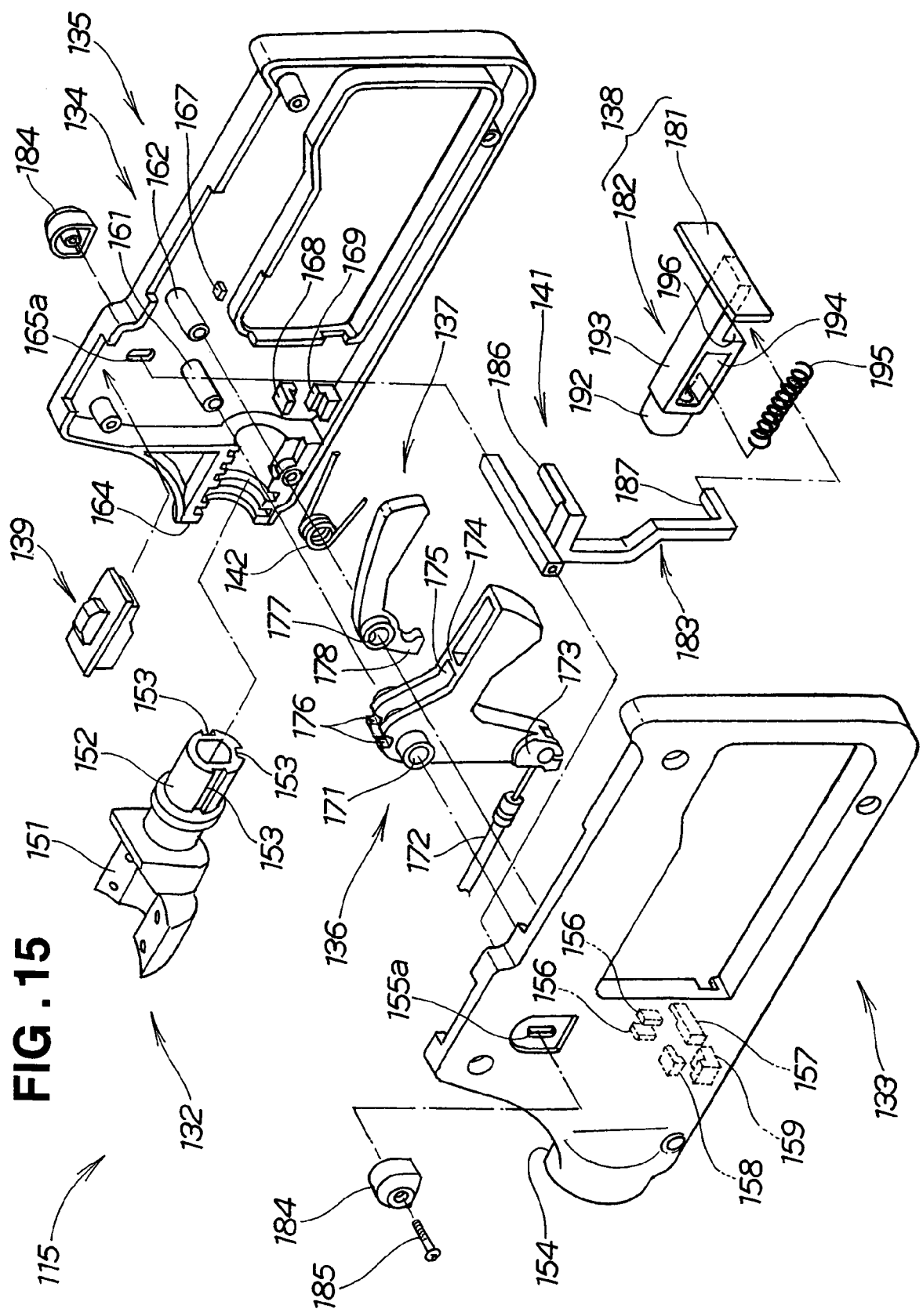
FIG. 15 is an exploded perspective view showing principal components of the operating handle in the second embodiment of the power working machine of the present invention.

FIG. 15 is an exploded perspective view showing principal components of the operating handle 115 employed in the power working machine 100 of FIG. 12. The shaft section 132 of the machine body 111 has a mounting portion 151 to be secured to the case member 131, a cylindrical portion 152 for rotatably supporting the handle body 135, and a plurality of locking grooves 153 for locking the handle body 135 at a desired rotational angle relative to the machine body 111. The plurality of locking grooves 153 are formed in spaced apart relation to one other along the circumference of the shaft section 132.

The left handle half 133 has a left fitting portion 154 for fitting around the shaft section 132, click bosses 155 (see also FIG. 18) for imparting a click feel to operation of the stopper section 141, an elongated hole 155a for the human operator to manipulate the stopper section 141, stopper guide portions 156 for sidably supporting the stopper section 141, a support rib (retaining rib) 157 for supporting the lever complex 138, and lever guide portions 158 and 159 for sidably supporting the lever complex 138. Means, such as a compression spring, for returning the stopper section 141 to its initial position may be provided on the handle body 135.

The right handle half 134 has a boss 161 for rotatably mounting thereon the throttle lever 136, a boss 162 for rotatably mounting thereon the throttle lock lever 137, a right fitting portion 164 for fitting around the shaft section 132, click bosses 165 (see also FIG. 18) for imparting a click feel to operation of the stopper section 141, an elongated hole 165a for the human operator to manipulate the stopper section 141, a portion 167 for holding one end of the torsion spring 142, and guide portions 168 and 169 for slidably supporting the lever complex 138.

The throttle lever 136 has a hole portion 171 for rotatably fitting therein the throttle-lever mounting boss 161, a support portion 173 for supporting one end of a throttle wire 172, an engagement portion 174 for abutting engagement with the throttle lock lever 137, and a guide portion 175 for allowing part of the throttle lock lever 137 to escape from the engagement portion 74.

The throttle lock lever 137 has a hole portion 177 for fitting therein the throttle-lock-lever mounting boss 162, an actuator portion 178 provided for abutting engagement with the engagement portion 174 in such a manner that it can escape from the engagement portion 174 to the guide portion 175 when necessary, and a portion 179 for holding the other end of the torsion spring 142 (see FIG. 14).

The lever complex 138 includes a lock cancellation lever or unlocking lever 181, and a lock mechanism 182 formed integrally with the lock cancellation lever 181. The lock cancellation lever 181 is movable along an axis (axial centerline) (not shown) of the shaft section 132.

The stopper section 141 includes a stopper body 183 for restricting operation of the throttle lever 136 and the lock mechanism 182, and stopper operating knobs 184 secured to the stopper body 183 by means of screws 185. The stopper section 141 is movable in a direction perpendicular to the axis of the shaft section 132.

The stopper body 183 has a first engagement portion 186 that engages with the throttle lever 136 while the lock mechanism 182 is unlocked, and a second engagement portion 187 that engages with the lock mechanism 182 while the pivotal movement of the throttle lever 136 is permitted.

Figure 16:
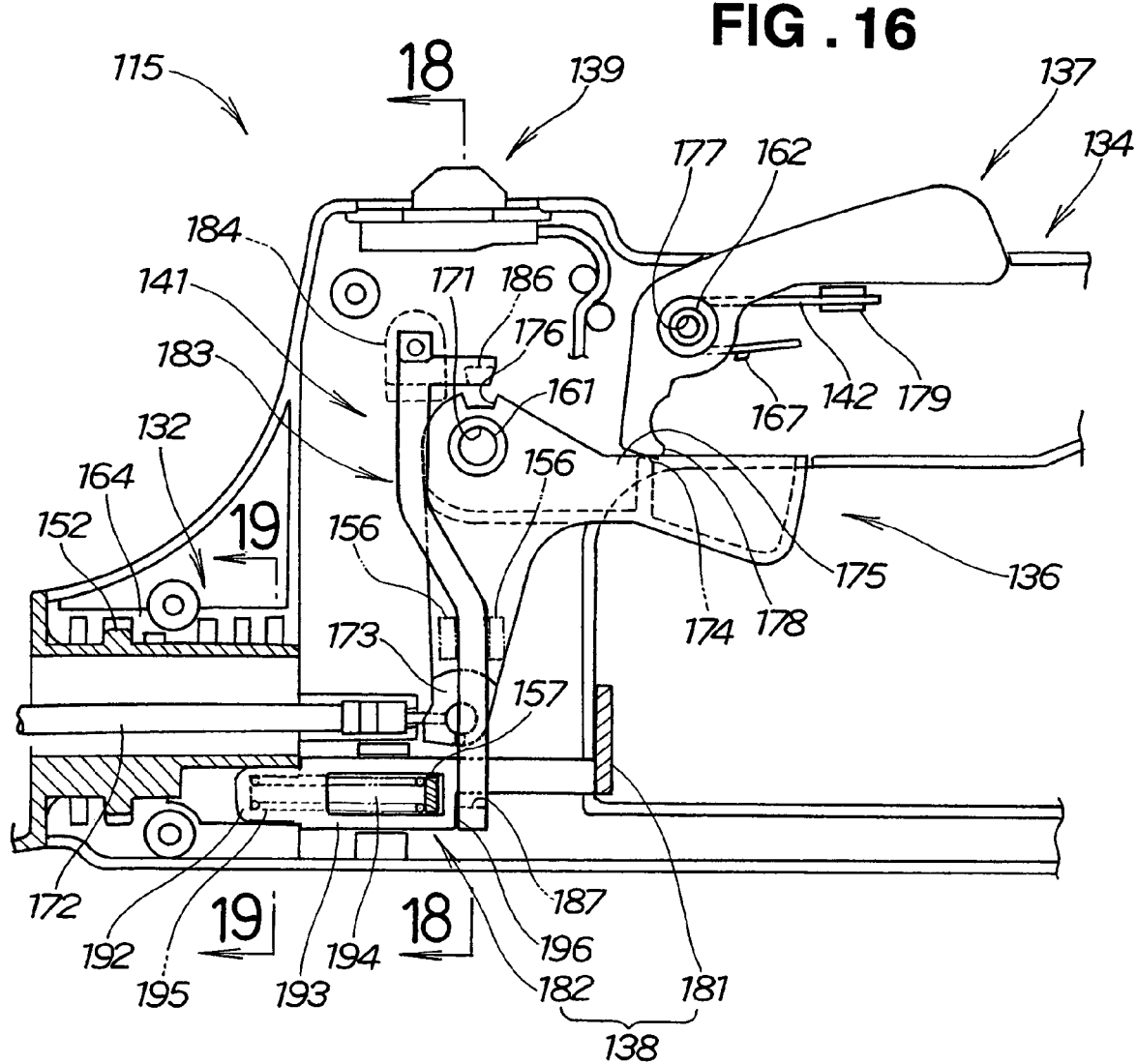
FIG. 16 is a longitudinal sectional view of a lock cancellation lever and lock mechanism in the second embodiment of the power working machine.

FIG. 16 is a longitudinal sectional view of the lock cancellation lever 181 and the lock mechanism 182 in the second embodiment of the power working machine 100. The lock mechanism 182 has a projection 192 for fitting engagement with any desired one of the locking grooves 153 of the shaft section 132 (see FIG. 15), a horizontal portion 193 extending from the projection 192 toward the rear of the handle 115 (i.e., toward the human operator) to merge with the lock cancellation lever 181, a spring holding portion 194 formed in the horizontal portion 193, and a return spring 195 having its front end held by the spring holding portion 194 and its rear end held by the supporting rib 157 and functioning to return the entire lever complex 138 (lock cancellation lever 181 and the lock mechanism 182) to the initial position. Stepped portion 196 is formed on the horizontal portion 193 for engagement with the second engagement portion 187 of the stopper body 183. With such arrangements, the lock mechanism 182 can lock the handle 115 to the shaft section 132 at a desired rotational angle.

Figure 17:
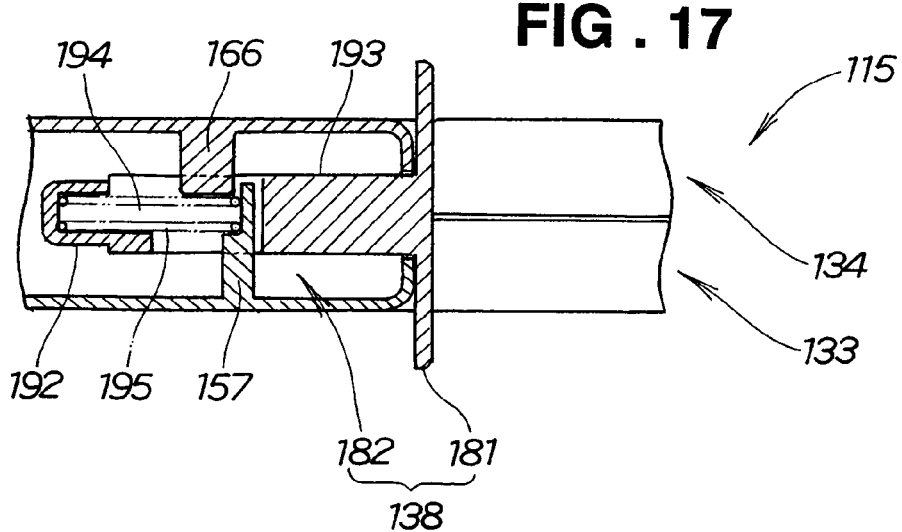
FIG. 17 is a vertical sectional view of the lock cancellation lever and lock mechanism in the second embodiment of the power working machine.

FIG. 17 is a vertical sectional view of the lock cancellation lever 181 and the lock mechanism 182 in the power working machine 100. In the lock mechanism 182 of FIG. 17, the return spring 195 is accommodated in the spring holding portion 194 with its rear end held by the rib 157 and normally urges the lever complex 138 toward the front of the operating handle 115. Thus, by the human operator pulling the lock cancellation lever 181 lever complex 138) toward the rear of the handle 15 (i.e., toward the human operator), the projection 192 can be released or disengaged from a given one of the locking grooves 153 of the shaft section 132, so as to permit the human operator to rotate the handle 115. Namely, by the human operator releasing (i.e.,. unhanding) the lever complex 138 after having rotated the handle 115 through a given rotational angle, the projection 192 can be automatically brought into engagement with another one of the locking grooves 153. Reference numeral 166 represents an auxiliary rib provided on the right handle half 134 for preventing accidental detachment of the return spring 195.

Figure 18:
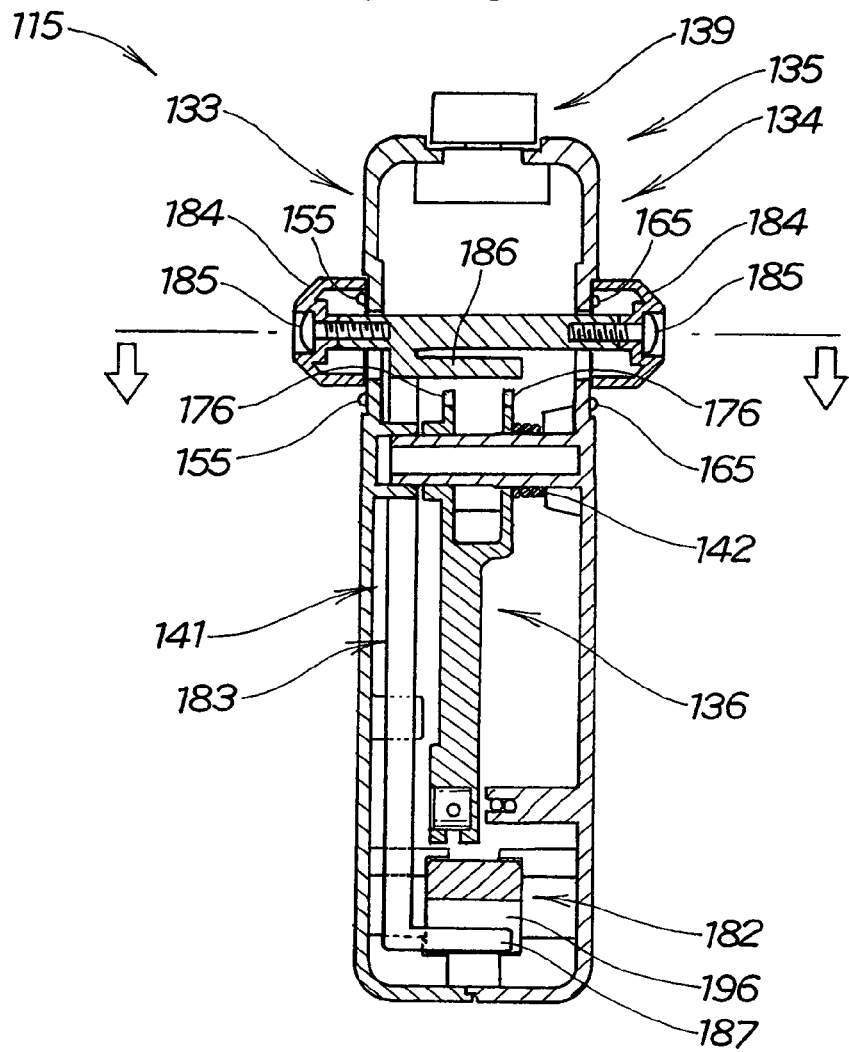
FIG. 18 is a sectional view taken along line 18-18 of FIG. 16.

FIG. 18 is a sectional view of the stopper section 141 taken along the 18-18 line of FIG. 16.

As the stopper operating knobs 184 are depressed by the human operator to lower the entire stopper body 183 as indicated by a white arrow, the first engagement portion 186 of the stopper body 183 is brought into fitting engagement with fitting portions 176 of the throttle lever 136, and the second engagement portion 187 is disengaged from the stepped portion 196 of the lock mechanism 196. Thus, the lock cancellation lever 181 (lever complex 138) can be pulled in the rearward direction of the operating handle 115.

In addition, the handle halves 133 and 134 have the click bosses 155 and 165 for imparting a clicking feel to operation of the operating knobs 184. These click bosses 155 and 165 function as lock means for locking the operating knobs 184 at a predetermined position. With the click bosses 155 and 165 functioning as the lock means for locking the operating knobs 184 at a predetermined position, movement of the stopper section 141 can be recognized easily, as a result of which the operating handle 115 can be operated by the human operator with increased ease.

Figure 19:
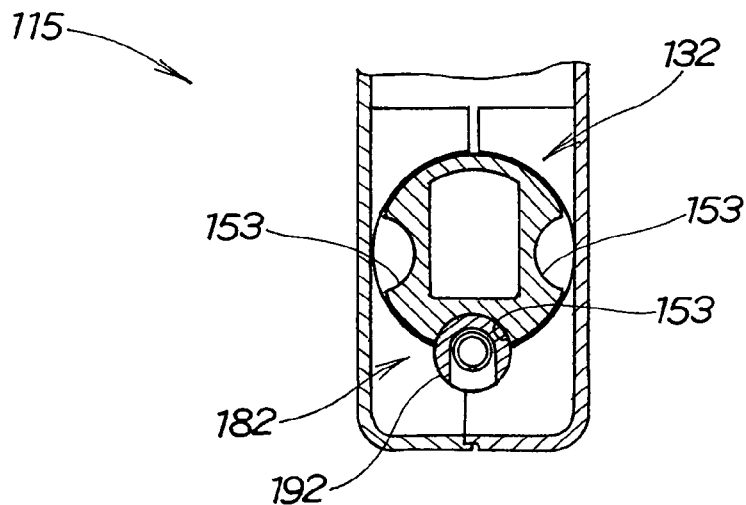
FIG. 19 is a sectional view taken along line 19-19 of FIG. 16.

FIG. 19 is a sectional view taken along line 19-19 of FIG. 16, which particularly shows the projection 192 of the lock mechanism 182 engaged by one of the locking grooves 153 formed in the shaft section 132. Because the plurality of locking grooves 153 are formed, in lower, left and right surface regions of the shaft section 132, spaced apart from each other along the shaft's circumference, the operating handle 115 can be set or locked in any of three positions relative to the machine body 111, so that the operational ease of the power working machine 100 can be even further enhanced.

Figure 20:
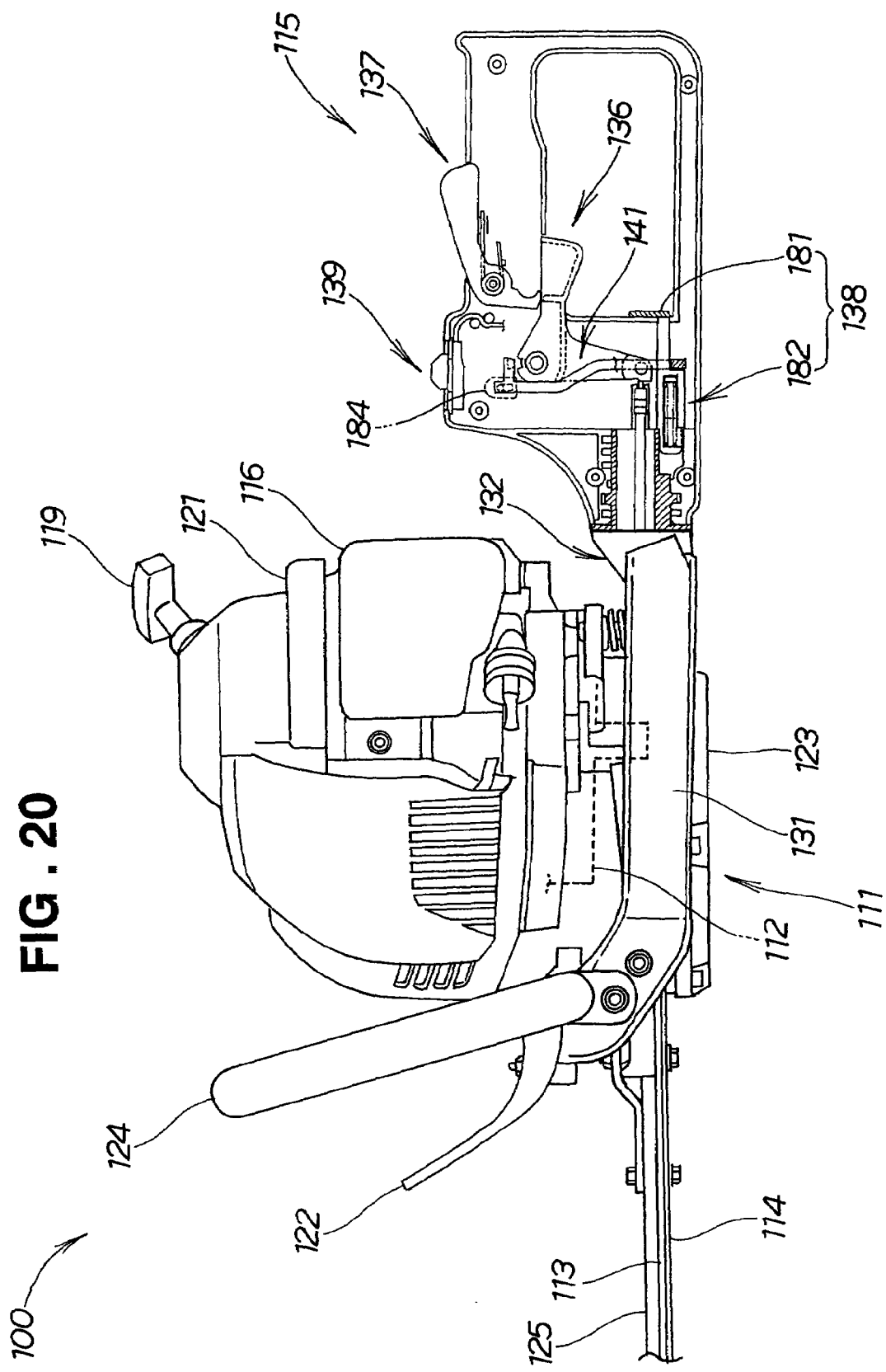
FIG. 20 is a view showing principal sections of a modified power working machine of the present invention.

FIG. 20 is a view showing principal sections of a modification of the power working machine 100 of the present invention. The modified power working machine 100 of FIG. 20 includes upper and lower trimming blades 113 and 114 attached to a front portion of a machine body 111 to trim a hedge, an operating handle 115 provided on a rear portion of the machine body 111, a drive source 112 mounted generally centrally on the machine body 111 for driving the trimming blades 113 and 114, and a throttle lever 136 mounted on the operating handle 115 for pivotal movement between its non-operating and operating positions to adjust the output power from the drive source 112. The operating handle 115 includes a lever complex 138 connected to the handle body, and the lever complex 138 includes a lock mechanism 182 for locking the operating handle 115 against a shaft section 132 of the machine body 111 at a desired rotational angle, a lock cancellation lever or unlocking lever 181 for placing the lock mechanism 182 in an unlocking position (i.e., unlocking the lock mechanism 182), and a stopper section 141 for permitting operation of the lock mechanism 182 while the pivotal movement of the throttle lever 136 is inhibited or disabled and for inhibiting operation of the lock mechanism 182 while the pivotal movement of the throttle lever 136 is permitted.

The stopper section 141 includes stopper operating knobs 184 to allow the human operator to operate the stopper section 141 on any of front and left and right sides of the operating handle 115. Thus, when the stopper section 141 is to be operated to rotate the operating handle 115, the human operator can operate the stopper section 141 on any of the front and left and right sides of the operating handle 115 spaced apart from the throttle lever 136. As a consequence, when the human operator intends to operate just one of the throttle lever 136 and operating handle 115, it is possible to prevent the human operator from erroneously operating the other or both of the throttle lever 136 and handle 115; thus, the throttle lever 136 and operating handle 115 can be operated by the human operator with even further enhanced reliability.

Next, behavior of the second embodiment of the power working machine 100 will be described.

Figure 21A:
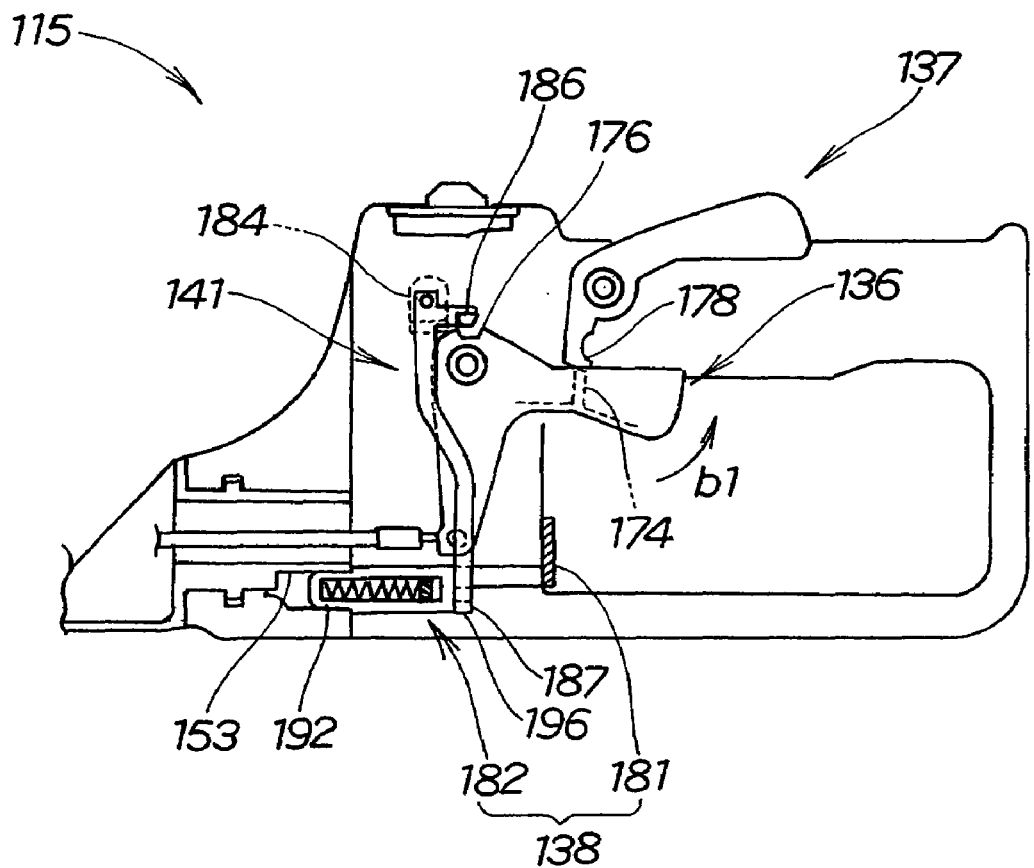
FIGS. 21A and 21B are views explanatory of how the operating handle and lever complex are locked in the second embodiment of the power working machine.
Figure 21B:
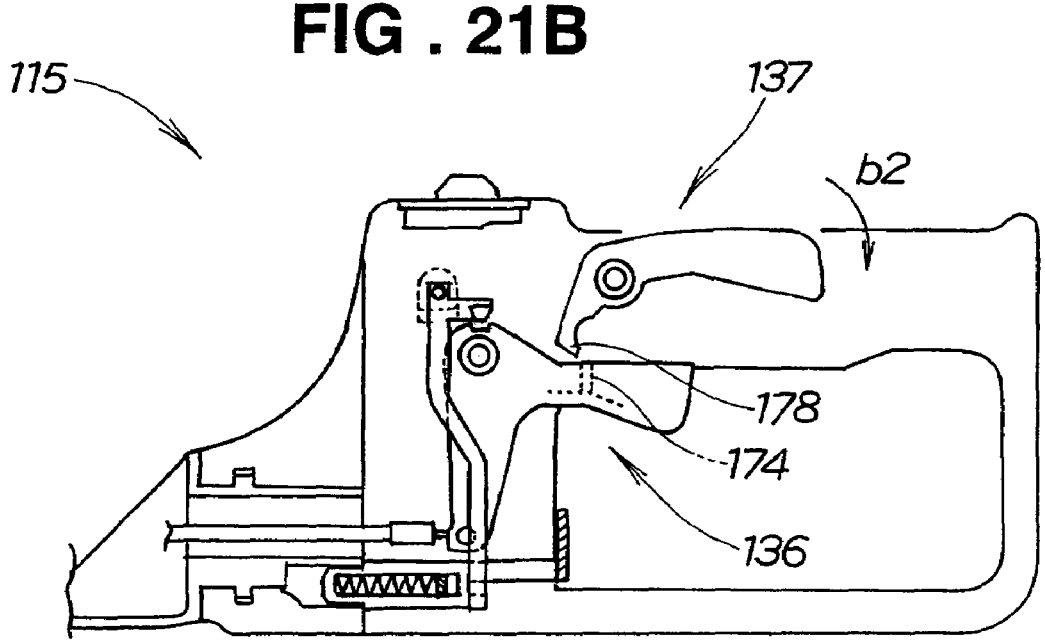

FIGS. 21A and 21B are views explanatory of how the operating handle 115 and lever complex 138 are locked in the power working machine 100.

As seen in FIG. 21A, the actuator portion 178 of the throttle lock lever 137 is normally abutted against the engagement portion 174 of the throttle lever 136, so that the throttle lever 136 can be prevented from being erroneously pulled by the human operator in the direction of an arrow b1.

By the human operator pressing the throttle lock lever 137 as indicated by an arrow b2 in FIG. 21B, the actuator 178 is forced away from the engagement portion 174, and thus the throttle lever 136 can be brought into its operating position.

Figure 22A:
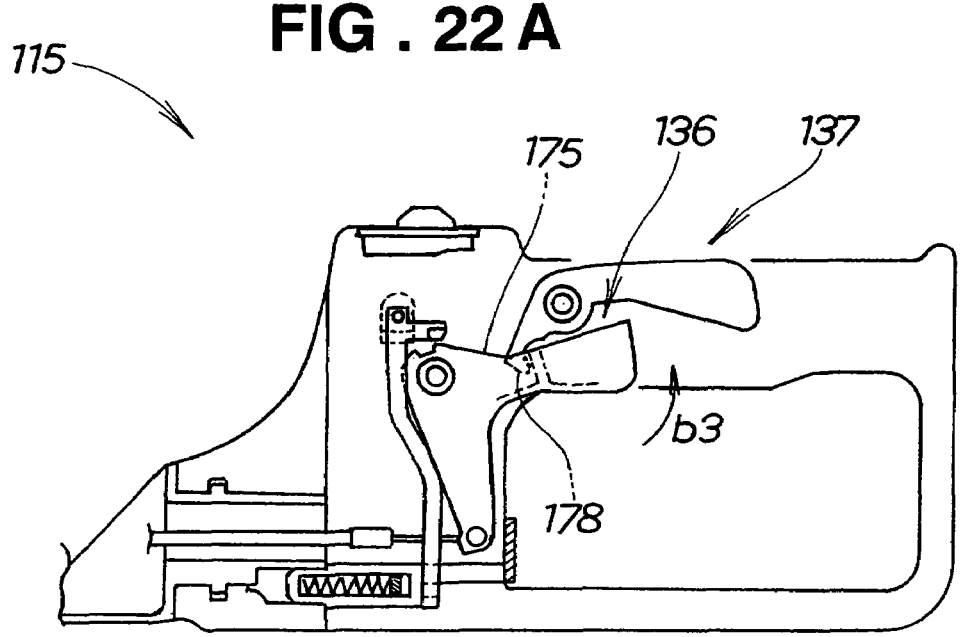
FIGS. 22A and 22B are views explanatory of how the throttle lever and operating handle are operated in the second embodiment of the power working machine.
Figure 22B:
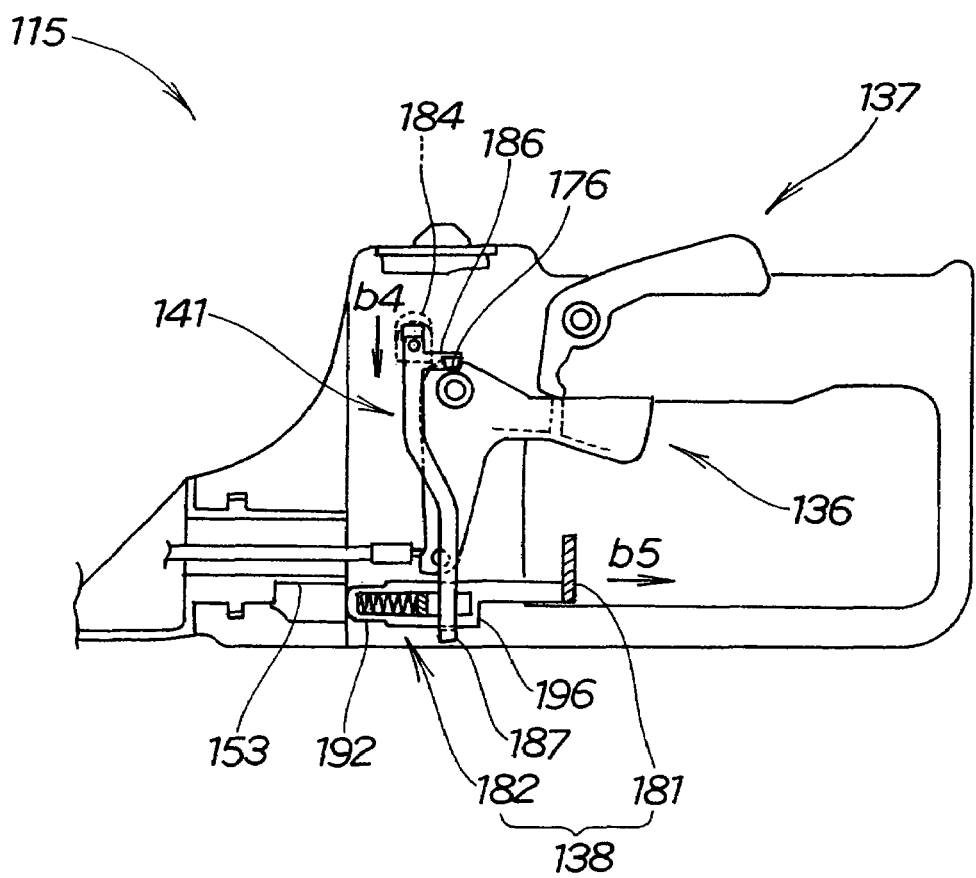

FIGS. 22A and 22B are views explanatory of how the throttle lever 136 and the operating handle 115 are operated in the power working machine 100.

As the throttle lever 136 is pulled upward by the human operator as depicted by an arrow b3 in FIG. 22A, the actuator portion 178 of the throttle lock lever 137 is allowed to escape to the guide portion 175 of the throttle lever 136, and the upper and lower trimming blades 113 and 114 of FIG. 12 can be actuated via the drive source 112 to perform desired trimming work.

As the stopper operating knobs 184 are depressed to lower the entire stopper body 183, as indicated by an arrow b4 in FIG. 22B, when the throttle lever 136, throttle lock lever 137 and lever complex 138 are in their respective positions illustrated in FIG. 21A, the first engagement portion 186 of the stopper body 183 is brought into fitting engagement with fitting portions 176 of the throttle lever 136, and the second engagement portion 187 is disengaged from the stepped portion 196 of the lock mechanism 182. Thus, the throttle lever 136 is placed in the locked position, and the human operator can now pull the lever complex 138 (lock cancellation lever 181 and lock mechanism 182) in the rearward direction the operating handle 115 as indicated by an arrow b5 and rotate the operating handle 115.

Figure 23:
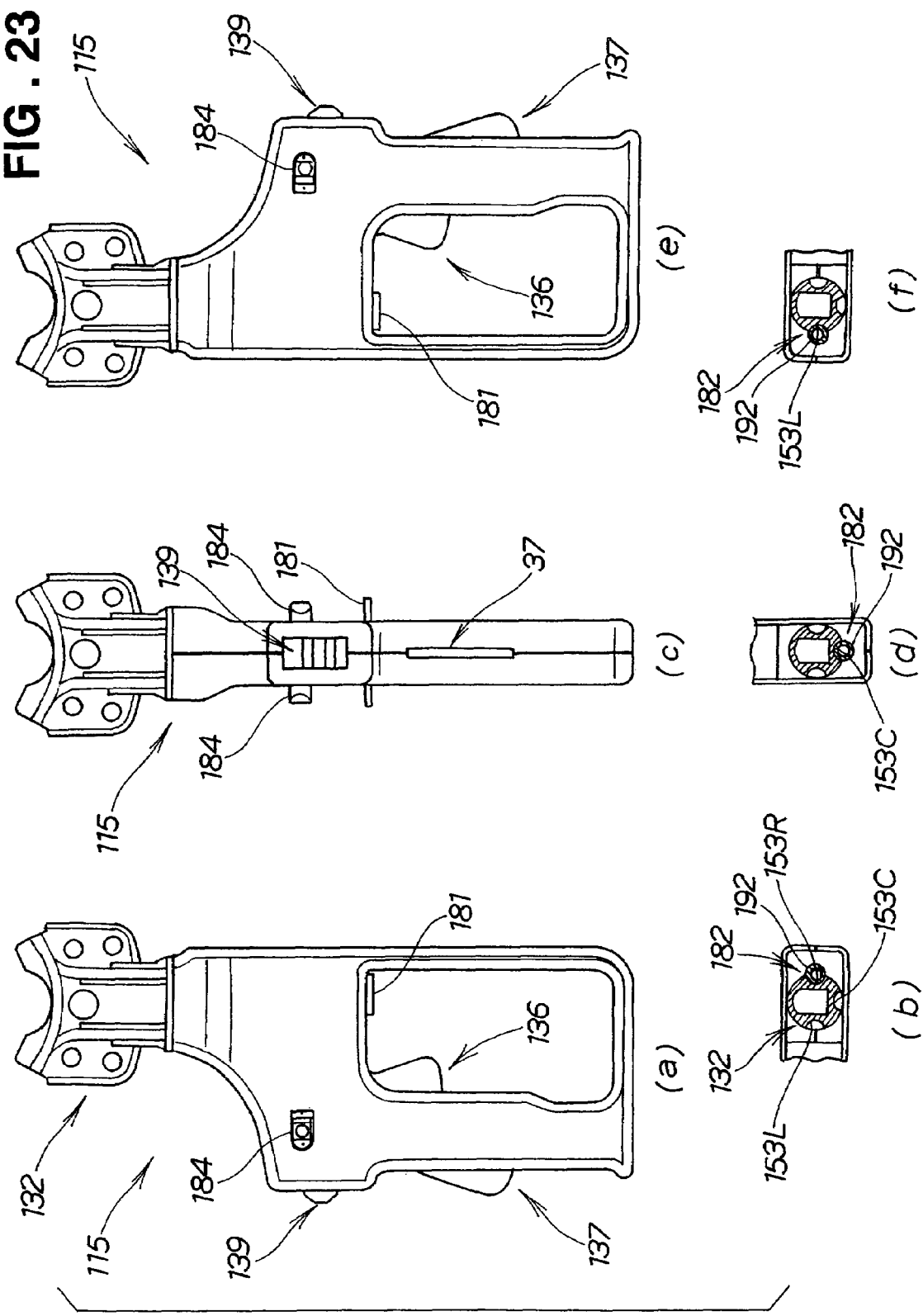
Figure 24:
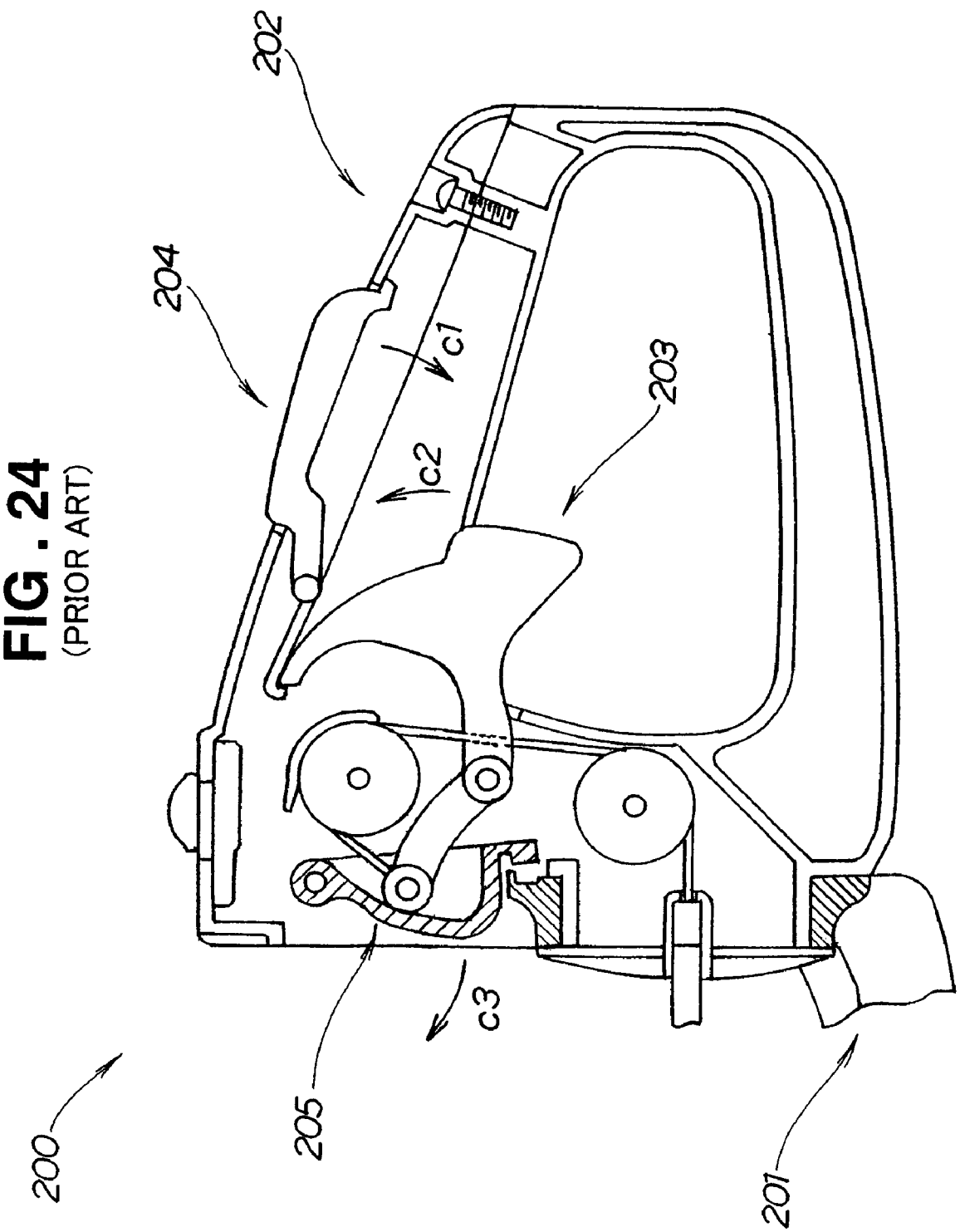
FIG. 24 is a view showing a fundamental construction of a conventionally-known power working machine.

FIG. 23 is a view explanatory of operation of the operating handle 115, which particularly shows various rotational positions the handle 115 can be set in. In the figure, the left, middle and right locking grooves 153 of the shaft section 132 are represented by 153L, 153C and 153, respectively, for purposes of description.

Section (a) of FIG. 23 shows the operating handle 115 set in a position rotated leftward or counterclockwise by 90 degrees from its normal, upright position, and this position is suitable, for example, for trimming a lower side surface of a hedge or the like. In this position, the projection 192 of the lock mechanism 182 is fitted in and locked by the right locking groove 153R, as illustrated in section (b).

Section (c) of FIG. 23 shows the operating handle 115 set in the normal, upright position, which is suitable, for example, for trimming an upper surface of a hedge or the like. In this position, the projection 192 is fitted in and locked by the middle locking groove 153C, as illustrated in section (d).

Section (e) FIG. 23 shows the operating handle 115 set in a position rotated rightward or clockwise by 90 degrees from the normal, upright position, and this position is suitable, for example, for trimming an upper side surface of a hedge or the like. In this position, the projection 192 is fitted in and locked by the left locking groove 153L, as illustrated in section (f).

It should be apparent that the operating handle 15 in the first embodiment of the power working machine 10 can also be set in various rotational positions as illustrated in FIG. 23.

Whereas the embodiments of the power working machine have been described as driving both of the upper and lower trimming blades 13, 113 and 14, 114, the present invention is not so limited. For example, the power working machine may be constructed to reciprocate only one of the upper and lower trimming blades relative to the other to perform desired trimming work.

Further, whereas, in the described embodiments, the upper and lower trimming blades 13, 113 and 14, 114 are each preferably in the form of a double-edged blade capable of trimming in leftward and rightward directions, the blades 13, 113 and 14, 114 may be single-edged blades capable of trimming in only one of the leftward and rightward directions.

Furthermore, in the described first embodiment, the throttle-lever mounting boss 55 and throttle-lock-lever mounting boss 56 are formed on the left handle half 33 as seen in FIG. 4, but the present invention is not so limited. For example, the throttle-lever mounting boss 55 and throttle-lock-lever mounting boss 56 may be formed on the right handle half 34, or on both of the left and right handle halves 33 and 34.

Moreover, in each of the above-described embodiments, the lock cancellation lever 81, 181 and lock mechanism 82, 182 are formed integrally to provide the lever complex 38, 138, the present invention is not so limited. For example, the lock cancellation lever 81, 181 and lock mechanism 82, 182 may be formed separately and interconnected via suitable fastener means.

Furthermore, the first embodiment has been described above as restricting operation of the lock mechanism 82 by means of the stopper section 41 (see FIG. 9). Alternatively, operation of the lock cancellation lever 81 may be restricted by means of the stopper section 41.

Obviously, various minor changes and modifications of the present invention are possible in the light of the above teaching. It is therefore to be understood that within the scope of the appended claims the invention may be practiced otherwise than as specifically described.

What is claimed is:

1. A power working machine comprising:
   a machine body having a front portion, a rear portion, and a shaft section extending from the rear portion;
   cutting means connected to a front portion of the machine body for performing a cutting operation;
   a drive source mounted on the machine body for driving the cutting means;
   an operating handle disposed on the rear portion of the machine body for gripping by an operator, the operating handle being mounted on the shaft section of the machine body for undergoing rotation relative to the machine body;
   a throttle lever for adjusting an output of the drive source, the throttle lever being mounted on the operating handle for undergoing pivotal movement between a non-operating position and an operating position;
   a lock mechanism mounted on the operating handle for locking the operating handle at a preselected rotational angular position relative to the machine body;
   a lock cancellation lever mounted on the operating handle for unlocking the lock mechanism to thereby permit rotational movement of the operating handle relative to the machine body; and
   a stopper section mounted on the operating handle at a position spaced apart from the throttle lever for permitting operation of the lock mechanism while preventing pivotal movement of the throttle lever and for preventing operation of the lock mechanism while permitting pivotal movement of the throttle lever.

2. A power working machine as claimed in claim 1; wherein the lock cancellation lever is mounted for undergoing movement along an axis of the shaft section of the machine body; and wherein the stopper section is mounted for undergoing movement in a direction generally perpendicular to the axis of the shaft section of the machine body.

3. A power working machine as claimed in claim 2; wherein the stopper section has a first engagement portion for engagement with the throttle lever while the lock mechanism is unlocked and a second engagement portion for engagement with the lock mechanism while pivotal movement of the throttle lever is permitted.

* * * * *